United States Patent
Sapienza et al.

(10) Patent No.: US 6,974,274 B2
(45) Date of Patent: *Dec. 13, 2005

(54) INDEXING SYSTEM PACKAGE AND DISPLAY SYSTEM

(75) Inventors: Mark C. Sapienza, New Lenox, IL (US); John E. Peters, Jr., Lake Forest, IL (US)

(73) Assignee: ACCO Brands USA LLC, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/854,401

(22) Filed: May 26, 2004

(65) Prior Publication Data

US 2004/0253047 A1 Dec. 16, 2004

Related U.S. Application Data

(60) Continuation of application No. 10/294,720, filed on Nov. 15, 2002, now Pat. No. 6,752,428, which is a division of application No. 09/883,379, filed on Jun. 19, 2001, now Pat. No. 6,511,246.
(60) Provisional application No. 60/256,326, filed on Dec. 19, 2000, and provisional application No. 60/234,162, filed on Sep. 20, 2000.

(51) Int. Cl.$^7$ ................................................ B42F 13/00
(52) U.S. Cl. ..................... 402/79; 206/387.13; 283/36; 402/73; D19/26
(58) Field of Search ................ 402/70, 73, 75, 402/79; D19/26; 283/36–42; 206/307, 308.1, 308.3, 387.13

(56) References Cited

U.S. PATENT DOCUMENTS

| | | | |
|---|---|---|---|
| 154,768 A | 9/1874 | Sargent | |
| 356,334 A | 1/1887 | Rosewater | |
| 371,791 A | 10/1887 | Rosewater | |
| 675,909 A | 6/1901 | Shepard | |
| 813,748 A | 2/1906 | Smith | |
| 856,861 A | 6/1907 | Gloe | |
| 1,026,804 A | 5/1912 | Hare | |
| 1,272,149 A | 7/1918 | Thompson | |
| 1,376,198 A | 4/1921 | Goldstone | |
| 1,600,582 A | 9/1926 | Ellis | |
| 2,330,402 A | 9/1943 | Winokar | |
| 3,208,772 A | * 9/1965 | Dahlstrand et al. | ........ 283/63.1 |
| 3,301,263 A | 1/1967 | Spees | |
| 4,175,777 A | 11/1979 | Horn | |
| 4,445,711 A | 5/1984 | Cunningham | |
| 4,477,013 A | 10/1984 | Herrin | |
| 4,485,962 A | 12/1984 | Farley | |
| 4,516,871 A | 5/1985 | Leitman | |

(Continued)

FOREIGN PATENT DOCUMENTS

| | | |
|---|---|---|
| BA | 64843 | 12/1955 |
| CN | 2287088 Y | 8/1998 |
| CN | 2343116 Y | 10/1999 |
| CN | 1241493 | 1/2000 |
| FR | 983644 | 6/1951 |

*Primary Examiner*—Monica S. Carter
(74) *Attorney, Agent, or Firm*—Michael Best & Friedrich LLP

(57) ABSTRACT

An indexing system with a label display configured for connection to a stack holder for placement adjacent a stack of sheets held in the stack holder. The display has a label portion disposed in a viewing position beyond the stack and is configured for displaying label indicia thereon for identifying a section of the stack. A divider is configured for dividing the section of the stack from other sections and for mounting in the stack holder within the stack. A tab connected to the divider and positionable extending beyond the stack and over the label portion is configured to permit viewing of the indicia therethrough with the divider held in the stack holder. An indexing system package and a system for displaying indexing system packages is also disclosed.

19 Claims, 24 Drawing Sheets

U.S. PATENT DOCUMENTS

| | | |
|---|---|---|
| 4,629,349 A | 12/1986 | Pitts |
| 4,639,157 A | 1/1987 | Herzfeld |
| 4,669,754 A | 6/1987 | Lalonde |
| 4,784,508 A | 11/1988 | Shannon |
| 4,863,194 A | 9/1989 | Friedman |
| 4,907,905 A | 3/1990 | Fournier |
| 4,932,683 A | 6/1990 | Perazza |
| 5,123,676 A | 6/1992 | Donnelly et al. |
| 5,299,879 A | 4/1994 | Burrow |
| 5,503,435 A | 4/1996 | Kline |
| 5,503,487 A | 4/1996 | Ong |
| 5,513,457 A | 5/1996 | Byrnes et al. |
| 5,618,033 A | 4/1997 | Owen et al. |
| 5,713,567 A | 2/1998 | Owen et al. |
| 5,875,579 A | 3/1999 | Winzen |
| 5,908,259 A | 6/1999 | Johnson |
| 5,924,736 A | 7/1999 | Russo |
| 5,947,525 A | 9/1999 | Pollman |
| 6,047,879 A | 4/2000 | Henrikson et al. |
| 6,050,404 A | 4/2000 | Lee |
| 6,106,018 A | 8/2000 | McKeown et al. |
| 6,109,812 A | 8/2000 | Welch |
| 6,132,831 A | 10/2000 | Thomas-Cote |
| 6,182,827 B1 | 2/2001 | Su |
| 6,220,775 B1 | 4/2001 | Dottel |
| 6,488,433 B2 | 12/2002 | Wien et al. |
| 6,511,246 B2 | 1/2003 | Sapienza et al. |
| 6,543,379 B2 | 4/2003 | Schwartz |
| 6,752,428 B2 * | 6/2004 | Sapienza et al. .............. 283/36 |
| 2002/0033595 A1 | 3/2002 | Sapienza et al. |
| 2002/0041789 A1 | 4/2002 | Conklin et al. |
| 2002/0094226 A1 | 7/2002 | Sapienza et al. |
| 2002/0102125 A1 | 8/2002 | Sapienza et al. |
| 2002/0134298 A1 | 9/2002 | Schwartz |

* cited by examiner

INDEXING SYSTEM PACKAGE AND DISPLAY SYSTEM

RELATED APPLICATIONS

This application is a continuation of U.S. patent application Ser. No. 10/294,720, filed on Nov. 15, 2002 now U.S. Pat. No. 6,752,428, which is a divisional application of U.S. patent application Ser. No. 09/883,379, filed on Jun. 19, 2001, now U.S. Pat. No. 6,511,246, which claims the benefit of U.S. Provisional Application No. 60/256,326, filed Dec. 19, 2000 and Ser. No. 60/234,162 filed on Sep. 20, 2000, the entire contents of which are incorporated by reference.

FIELD OF THE INVENTION

The invention relates to an indexing system including tabbed dividers that are locatable adjacent to label indicia on a display element. More particularly, the invention relates to a system of dividers with see-through tabs for placement over indicia identifying the divider.

BACKGROUND OF THE INVENTION

Typical dividers for stacks of sheets such as paper have tabs extending beyond the stack. The tabs are labeled to identify the divided sections of the stack. Some known tabs have transparent pockets to insert a label connected directly to the divider. The dividers are often employed in stack holders, such as binders, including ring binder and spiral binders and other types, books, and folders typically have two covers that pivot with respect to a binding assembly such as a spine. The dividers separate and visually label various sections, such as chapters, that are bound and to permit easy access to any one of these sections. The area provided for the indicia that identifies the sections is limited by the size of the tab.

U.S. Pat. No. 4,516,871 shows tabulated sheet protectors with tab sections that have letters printed thereon. Also, U.S. Pat. No. 5,908,259, for example, discloses an index sheet assembly with divider sheets that have outstanding tabs. The tabs align with sections on a foldout portion of the assembly.

SUMMARY OF THE INVENTION

The invention relates to an indexing system that includes a label display element that is associable with a stack of objects. The display element includes a label portion disposed in a viewing position beyond the stack and configured for displaying label indicia identifying a one or more objects in the stack. At least one tab is associable with the objects of the stack in a tab position extending beyond the stack and over at least a portion of the label portion. In addition, the tab is configured to permit viewing of the label indicia through the tab.

Preferably, the indexing system also includes a body portion connected to the tab and configured for positioning the tab in the tab position. In an embodiment of the invention, the body portion comprises a divider configured for separating the objects of the stack, and the body portion can include a pocket. In one embodiment, the body portion and the display element are operatively connected along two edges disposed at an angle to each other to form a pouch for receiving a section of the stack.

The tab can include a framed window portion that permits viewing of the label indicia therethrough. Also, the tab may comprise a sufficiently translucent or transparent material such that the label indicia is visible through the material.

Preferably, the indicia receivable on the label portion includes first and second indicia disposed at first and second locations on the label portion. First and second tabs are positionable over at least a portion of the first and second indicia, respectively. The first and second tabs are preferably of different colors.

A preferred display element comprises a label sheet, and the display element includes a display holder configured and dimensioned to hold and position the label sheet in the viewing position, for placement under the tabs. In one embodiment, the label holder includes a pocket configured to hold the label sheet. Preferably, the stack of sheets that the sheet holder is configured to hold have predetermined dimensions, and the label sheet is also substantially of the predetermined dimension.

Preferably, the display element includes first and second display elements configured for holding in the stack holder on opposite sides of the stack. Additionally, the first and second display elements in the open position are disposed such that the divider is selectively movable from adjacent the label portion of the first display element to adjacent the label portion of the second display element.

In a preferred embodiment, the label display element comprises a label sheet. The label sheet includes a label binding portion for binding with a stack holder with a stack of objects having predetermined dimensions, a label edge disposed on the display element for extending beyond the stack, and a label portion disposed between the label edge and the stack and configured for receiving label indicia for identifying objects in the stack. A sectioning portion of the indexing system includes the body, with a body binding portion for binding to the sheet holder with the stack, and a tab associated with the body. The tab extends beyond the stack and over at least a portion of the label portion when the display element and sectioning portion are bound to the stack holder.

The label portion preferably includes a plurality of label portions, and the sectioning portion comprises a plurality of sectioning portions. Also, the tab of each sectioning portion is disposed with respect to the divider binding portion of said each sectioning portion for placement over at least a portion of a different one of the label portions when the label sheet and divider are bound to the stack holder. The preferred stack holder is a ring binder, and the label binding portion and the body binding portions each includes a mounting portion configured for receiving and attaching to the rings of the binder.

The label binding portion of one embodiment includes first and second panels, each bindable to the stack holder. An embodiment of the display element is bindable to the binding rings by the first panel, such that the label edge extends beyond the stack by a first lateral distance. This display element is also bindable to the binding rings by the second panel, such that the label edge extends beyond the stack at a second lateral distance that is different from the first lateral distance. The first and second panels are preferably foldably connected such that the label sheet is bindable to the sheet holder at the first and second lateral distances. With the first and second panels unfolded, the label edge may extend beyond the stack by the first lateral distance, and with the first and second panels in overlapping association, the label edge may extend beyond the stack by the second lateral distance.

One embodiment is a disk holder assembly with a case and a plurality of body portions pivotably connected to the case for separating disks in a stack of disks. At least one tab extends from the body portions for identifying sections of the stack of disks. In this embodiment, the body portions have a substantially round contour.

A preferred embodiment of an indexing system package has at least one indexing system element with a label window received in a container. The container has front and back covers and a label portion is disposed on the interior of the back cover with at least one label indicia provided on the label portion. The front cover has an opening adjacent the label window for viewing the label portion, and the label window is positioned visibly in the opening and over at least a portion of the label portion such that the label indicia is visible therethrough.

In one embodiment, the container comprises an envelope and the envelope has a second opening along a top edge for receiving the indexing system elements. The envelope can also include a flap extending from the front cover that bends over the opening to contact the back cover and seal the indexing elements therein. The front and back covers are dimensioned for positively positioning the label windows over the indicia. The indexing system elements can include a plurality of sheet dividers where each divider includes a tab extending therefrom that comprises the label window.

A package display system constructed according to the invention has a storage member for holding packages, a face member adjacent the storage member and having at least one label indicia disposed thereupon. At least one label window extends from the storage member and over the face member and the label window is positioned over at least a portion of the label portion such that the label indicia is visible therethrough.

A method of providing a user with a label template over a network according to the present invention comprises storing at least one label template on a server computer coupled to a network. The label template comprises an electronic file useable with preselected software and configured to provide a plurality of user modifiable text boxes when the template is used with the software. The label template is also configured to enable the printing of a label sheet with the text boxes printed on a sheet of paper in a preselected format to create a label display element. The method further comprises enabling the user to select the label template for download, and transmitting the label template to the user over the network.

DETAILED DESCRIPTION OF THE PREFERRED EMBODIMENTS

Figure 1:
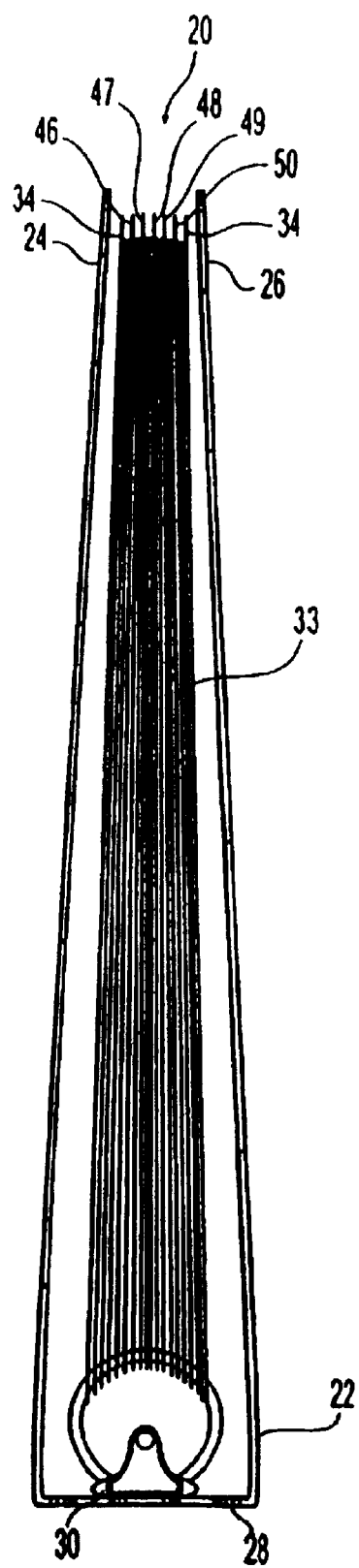
FIG. 1 is a bottom view of an index system constructed according to the present invention assembled in a three-ring binder.
Figure 2:
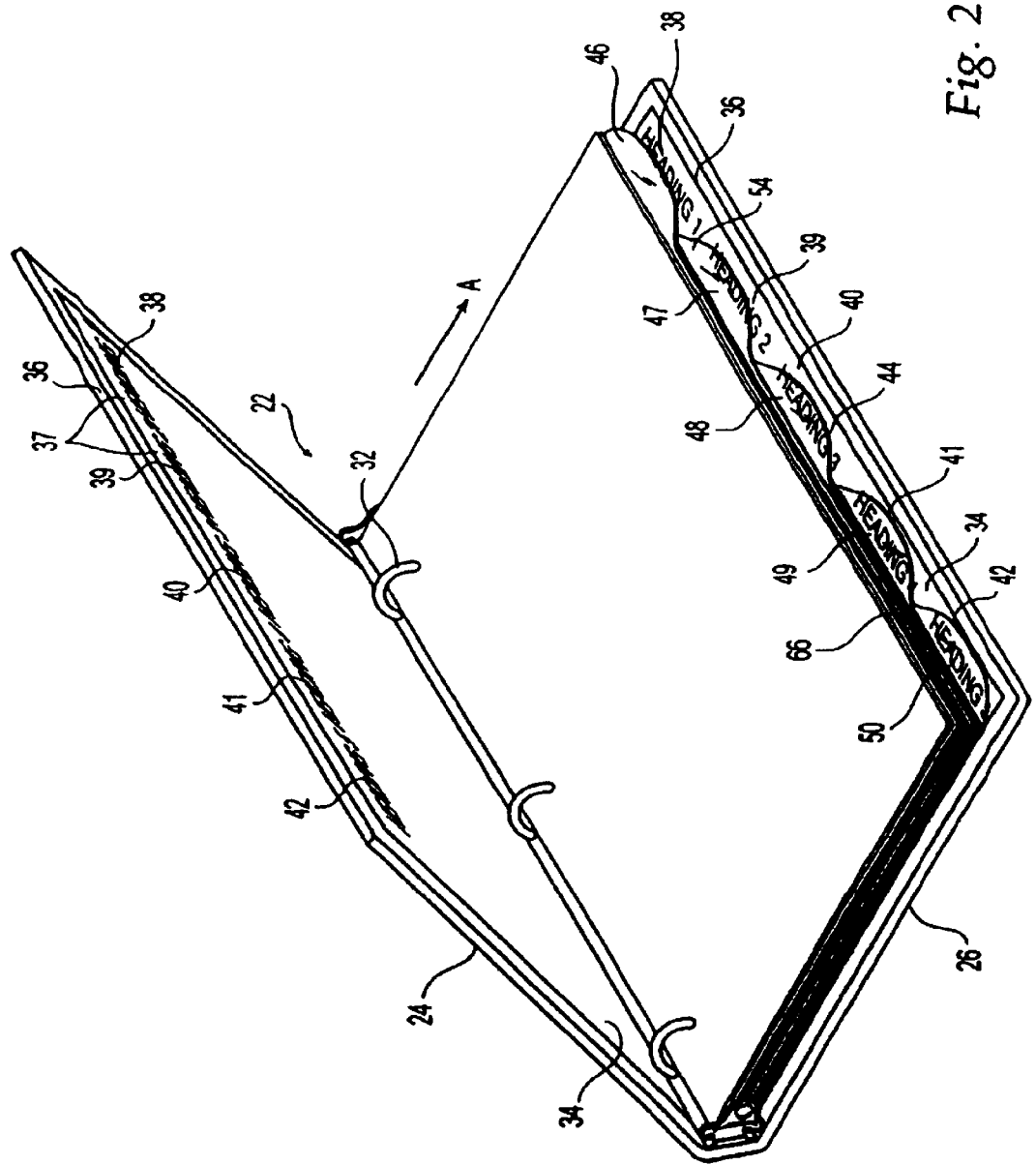
FIG. 2 is a perspective view thereof in a partially open position.

Referring to FIGS. 1 and 2, a first embodiment of an indexing system 20 constructed according to the present invention is shown in use with a stack holder that is a ring binder 22, such as a 3-ring binder. The binder 22 has a front cover 24, a back cover 26, and a spine 28, connecting the front and back covers 24 and 26. The binder 22 further includes a binding mechanism 30 attached to either cover 24 or 26 or the spine 28, preferably for releasably securing sheets or a stack of objects, such as a stack of sheets 33, to the binder 22. Suitable binding mechanisms include spirals, clamps, clasps, hooks, other ring-type mechanisms and other known binding mechanisms. The binding mechanism 30, as shown, is secured to the inside surface of the spine 28 and has substantially circular rings 32, although differentially shaped rings can be used. For example, equally suitable is a binding mechanism 30 having D-shaped rings secured to the inside surface of the back cover 26. The stack of sheets 33 is shown inserted within the binder 22 preferably with the rings 32 of the binder 22 engaging pre-punched holes disposed on the sheets 33. Additionally, the stack of sheets 33 is shown being divided into various sections. Additional stacks can be bound in the binder 22 behind the display elements. These additional stacks preferably may be either unindexed or indexed with a separate set of dividers.

In FIG. 2, the binder 22 is shown with the front cover 24 partially in an opened position, exposing the contents contained therein. This embodiment of the indexing system 20 has a front label display element, which preferably includes a label sheet 34 adjacent to the front cover 24 and a second label sheet 34 adjacent to the back cover 26. Each label sheet 34 includes a label edge 36 extending beyond the stack of sheets 33 contained in the binder 22. In other embodiments, the stack can include other types and shapes of objects. At least one label portion 37 is disposed on the label sheet 34 preferably in a viewing position between the label edge 36 and the stack 33, adjacent to label edge 36. Each label portion is configured for receiving at least one label indicia 44, shown as headings in the figures, to identify the various sections within the stack 33. Preferably, the label portions 37 include a plurality of label portions or areas 38–42 for receiving a plurality of indicia 44 with each indicia 44 corresponding to each section of the stack of sheets 33. Five headings 44 are shown extending substantially across all of the label portions 37 of the label sheet 34. The number of headings preferably corresponds to the number of sections contained in the stack of sheets 33, as desired by the user.

Figure 3:
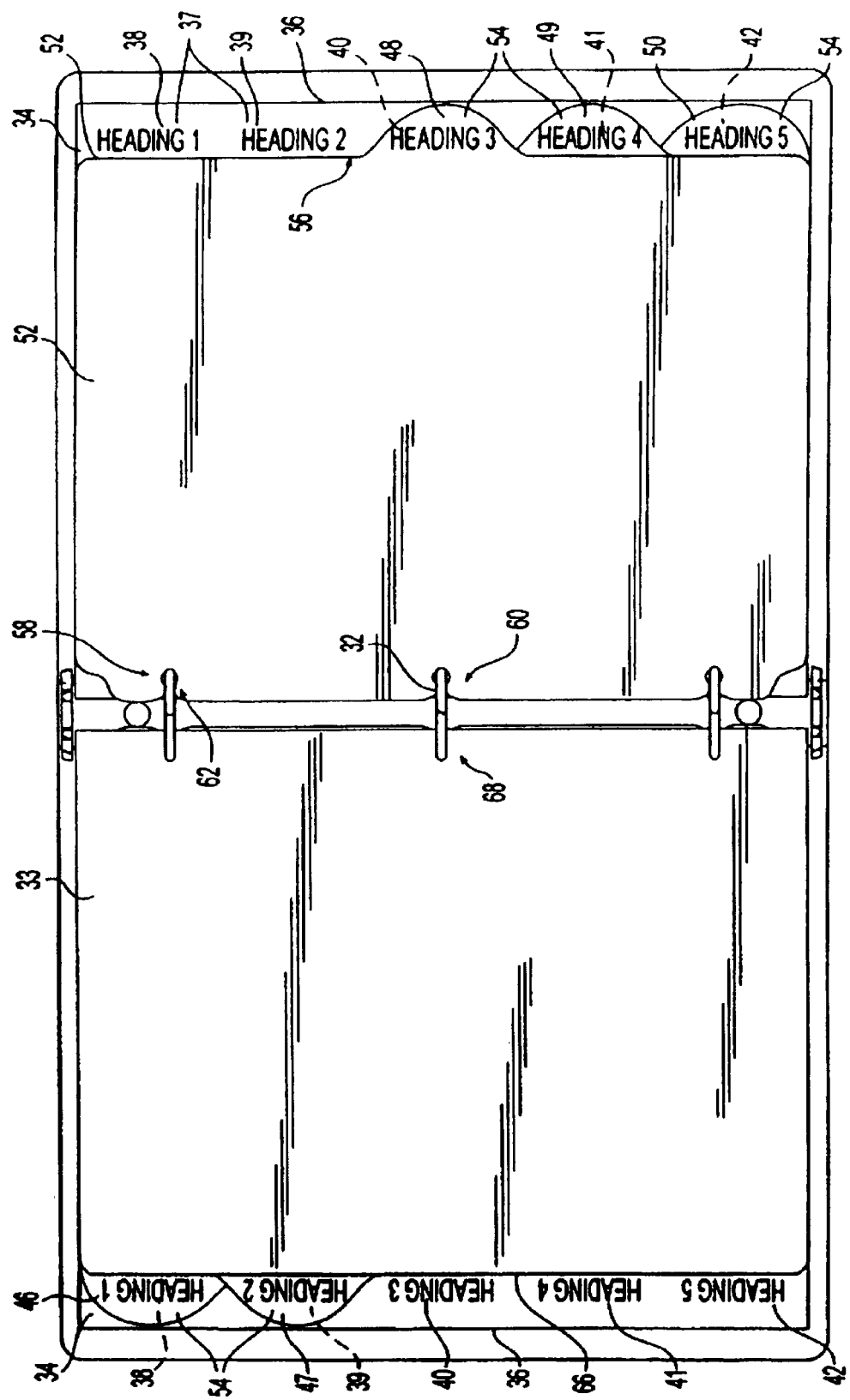
FIG. 3 is an inside front view thereof in an open position.

Referring to FIGS. 2 and 3, a preferred embodiment has at least one section indicator associable with the stack of objects, which preferably includes at least one divider, and preferably a plurality of dividers 46–50. The exemplary five dividers 46–50 are shown operatively associated with the label sheet 34 for dividing the various sections within the stack of sheets 33 in the binder 22. Each divider 46–50 has a body portion 52 and a tab 54 extending from a body edge 56, for dividing the objects in the stack. The body portions 52 preferably form part of the stack of objects. Each of the dividers 46–50 and the label sheets 34 have a divider binding portion 58 and a label binding portion 60. Each binding portion 58, 60 of the preferred embodiment includes a mounting portion 62, 64, configured for binding to the binding mechanism 30 preferably including apertures or pre-punched holes for receiving and attaching to the rings 32 of the binder 22. Accordingly, the dividers 46–50 and label sheets 34 are easily attached to the binder 22 by inserting pre-punched holes on the dividers 46–50 and label sheets 34 through the rings 32. Once inserted, the dividers 46–50 are operatively associated to the label sheets 34 to ensure that each section of the stack of sheets 33 is separated from the others. The label sheets 34 are preferably inserted with the dividers 46–50 therebetween, and are most preferably positioned and substantially adjacent the covers 24, 26 and on opposite sides of the dividers 46–50. Accordingly, the dividers 46–50 are selectively movable from adjacent the label portions 37 of the first label sheet 34 to adjacent the label portions 37 of the second label sheet 34 by sliding the pre-punched holes of the dividers 46–50 over the rings 32 when the dividers 46–50 and stack sections are flipped thereover.

The dividers 46–50 are additionally configured with respect to the dimensions of the stack of sheets 33 contemplated for use within the binder 22 such that the tabs 54 extend or project beyond an unbound edge 66 of the sheets, and preferably the edge opposite from the binding portion 68 of the stack. In alternative embodiments, the tabs extend from other edges, including edges adjacent the bound edge, such as the top and bottom edges, and the display portion and labels are aligned behind the tabs. For example, binders are commonly available for various standard size sheets of papers. Some of the typical sheets include the standard letter size, which measures 8½×11 inches, legal size, which measures 8½×14 inches, or A4 size, which measures 8.264× 11.684 inches. Other embodiments of dividers and display elements are sized for use with other sizes of binders, such as personal planners, for which typical sheet dimensions include 5½×8½ inches, 3¾×6¾ inches, 3½×6½ and 3×5 inches. To accommodate these various standard size sheets, the body 52 of the divider 46–50 employed is preferably of similar or substantially the same dimensions as the stack of sheets 33, although other shapes or sizes that are different than the sheets can alternatively be employed with the tab 54 extending beyond the sheet dimension. Accordingly, with the dividers 46–50 dividing the stack of sheets 33 in the binder 22, the tabs 54 of the various dividers 46–50 are preferably clearly visible by the user and may be used to locate the various sections within the stack of sheets 33.

Additionally, each tab 54 of the various dividers 46–50 is preferably further configured to extend from a different position along the divider edge such that when the plurality of dividers 46–50 is operatively associated with the label sheet 34 of the display station, each tab 54 of each divider 46–50 is in alignment with and preferably disposed over one label indicia 44 on the label portions 37. As shown in FIG. 2, preferably when viewed squarely from the front, the tab 54 is located over label indicia 44 marked as "HEADING 1" at label area 38, the tab 54 is over the label indicia 44 marked as "HEADING 2" at label areas 38–42 and so on through the final tab 54, which is over the label indicia 44 marked "HEADING 5" at label area 42. Thus, the five dividers 46–50 and their associated tabs 54 are shown with each subsequent tab 54 extending in alignment with and over the label portions 37 and label areas 38–42 at different stations along the divider edge. In this manner, each tab 54 preferably overlaps a different label indicia 44 disposed on the label portions 37. In the embodiment shown in FIG. 2, tabs 54 are substantially planar and label indicia 44 reside on a separate plane substantially parallel thereto, and offset or spaced from tabs 54.

Figure 4:
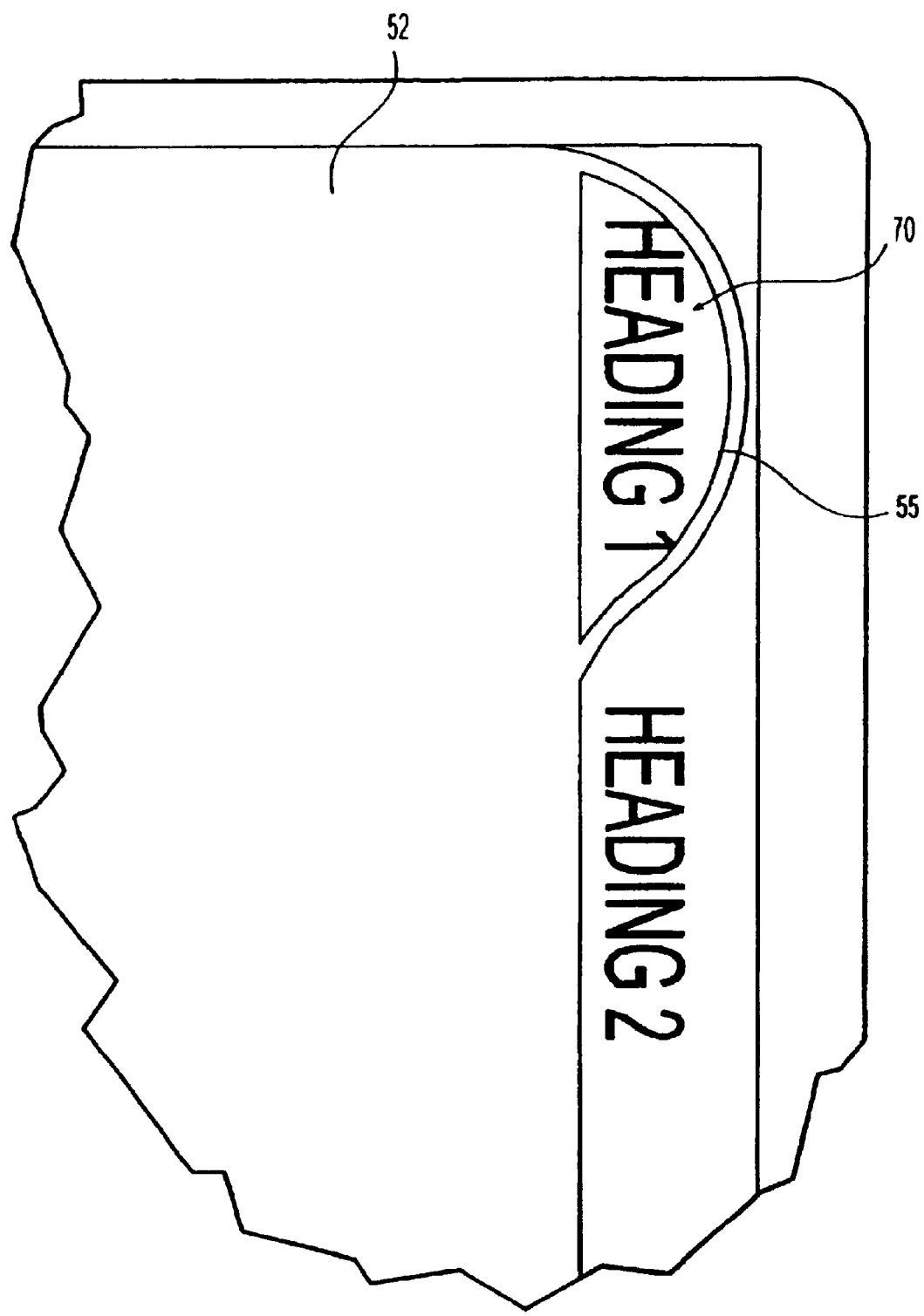
FIG. 4 is a front cutaway view of an alternative embodiment of the invention.

A window portion of each of the tab 54 is configured to permit viewing of the indicia 44 through the window portion when the dividers 46–50 and the label sheets 34 are secured to the binder 22. The window portion may be in the form of a cutout 70 made on the tab 54, as shown in FIG. 4, a cutout with a transparent covering, or in other forms to permit viewing of the label areas therebeneath. The window 70 of FIG. 4 has a frame 55 extending around the perimeter of the window 70. Preferably the entire tab 54 is made of a sufficiently translucent or transparent material to permit viewing of the indicia 44 behind the tab 54. The entire divider may alternatively be constructed of a transparent material.

The tab 54 of the divider are arranged sequentially at the various stations along the divider body edge 56, and all label indicia 44 is preferably easily viewed at a glance. As the label sheets 34 of two display elements are preferably secured to the binder 22 with the series of corresponding headings facing the stack of sheets 33 contained in the binder 22, as shown in FIG. 3, each of the headings is easily viewable through the windows on the tabs 54 regardless of the point along the stack of sheets 33 to which the binder 22 is opened.

For example, FIG. 3 shows the two dividers 46, 47 adjacent to the label portions 37 of one label sheet 34, while the remaining three dividers 48–50 are adjacent the label portions 37 of the other label sheet 34. Accordingly, a first portion of the group of tabs 54, namely the tabs 54 of the first two dividers 46, 47, permit viewing of a first portion of the headings, namely "HEADING 1" and "HEADING 2" of the front label sheet 34 and a second portion of the tabs 54, namely the tabs 54 of the last three dividers 48–50, permit viewing of a second portion of the headings, namely "HEADING 3," "HEADING 4," and "HEADING 5", which are disposed on the back label sheet 34. Thus, all headings and label areas 38–42 on both label sheets 34 are preferably easily viewable through windows of the tabs 54 adjacent thereto or plainly viewable adjacent to the divider edge and the edge of the sheets. Additionally, the dividers 46–50 and label sheets 34 are substantially flat when attached to the binder 22, further facilitating the ease of viewing the headings on the label portions 37. Moreover, when the plurality of dividers 46–50 are arranged so as to divide the stack of sheets according to the various sections, the number of dividers 46–50 preferably corresponds with the number of sections and the associated number of coordinated headings. Also, the tabs 54 are preferably approximately 2¼.times.½ inches, with a rounded contour, or the ends of the tabs 54 slightly tapered to form a handle to facilitate selection and gripping by the user.

Preferably, the dividers 46–50 are constructed from a material more rigid or stiff than the sheets of paper contained in the binder 22. Suitable materials include plastics, paper, cardboard, manila paper, and combinations thereof. Most preferably, the dividers 46–50 may be constructed with the body 52 and tab portion being transparent or translucent either in whole or in part and may either collectively be monochromatic or a mixture of colors. Preferably, the tab and the body 52 of the divider are integrally constructed. Most preferably, each divider is preferably constructed from a single sheet with the tab die cut from the sheet.

Figure 5:
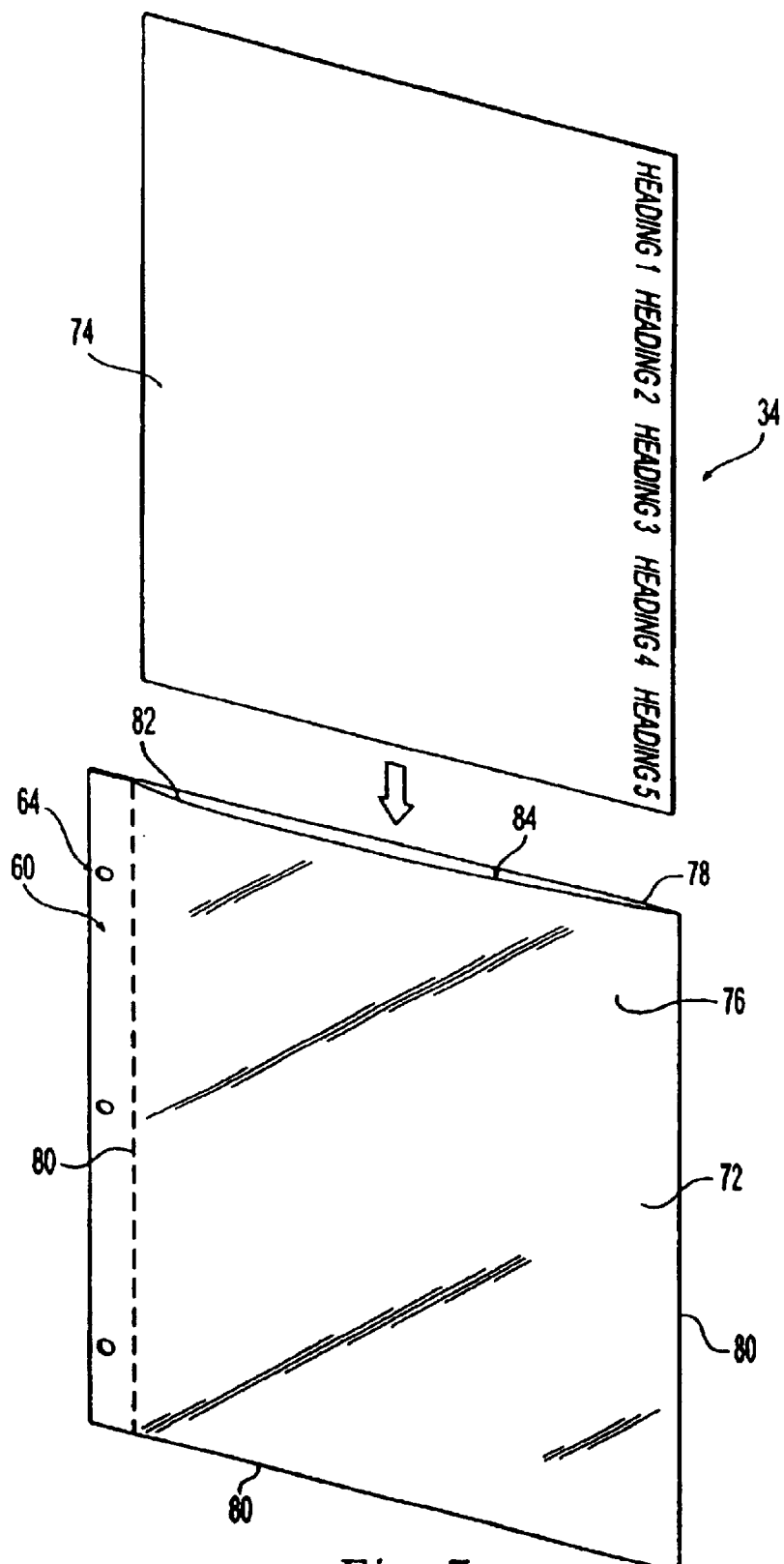
FIG. 5 is a perspective view of a display element constructed according to the invention.

Referring to FIG. 5, the label sheet of the preferred display element includes a label holder 72 that is configured to hold and position an indicia sheet 74 having the indicia 74, including the plurality of headings in the viewing position, such that the headings are disposed in alignment in the label areas 38–42 and label portions 37 of the display element. Each of the label sheets 34 includes front and back panels 76, 78 that are sealed along at least one side, and preferably three sides 80 to form a pocket 84, and open at another side 82 for receiving the indicia sheet 74. To facilitate such alignment of the indicia sheet 74, the pocket 84 of the label holder 72 extends from the label edge 36 substantially the width of the indicia sheet 74 toward the label binding portion 60 and has a width similar or slightly large than that of the indicia sheet 74.

Additionally, the indicia sheet preferably has about the same predetermined dimensions as the sheets of the stack contained in the binder 22. Thus, headings on the indicia sheet may be easily prepared by printing the headings on a printer on a standard size sheet of paper. Most preferably, the indicia sheet is printed by the user when printing the sheets to be stored in the binder 22. Using commonly available word processing software, the indicia sheet may be prepared at the same time as the user prepares the stack of sheets 33 and can be inserted within the pocket 84 of the label holder 72 along with the sheets into the binder 22.

Depending on the size and type of the binder 22 used with the present indexing system 20, the binding portion may benefit from adjustments to ensure proper alignment of the tabs 54 with the label indicia 44. For example, especially with round ring binder mechanisms, the lateral position of the unbound edge 66 of the stack can vary with respect to the relative position of the label portions 37, depending on the size of the rings 32 and thickness of the stack. A larger ring will tend to position the display element further inwardly, towards the binding mechanism 30 to the stack unbound edge 66 for a commonly available 1 inch binder 22 having rings 32 with approximately a 1 inch radius, the unbound edge 66 of the sheets near the center of the stack may be shifted with respect to the unbound edge 66 of the sheets at the front or back of the stack by about one-half inch due to the shape of the rings 32. This behavior of the sheets is less noticeable when the binder 22 has a smaller ring capacity or with D-shaped rings 32. With a 3 inch or 5 inch binder, the difference between edge positions of the sheets in the stack with the binder 22 in the opened position becomes significantly more prominent.

Figure 6:
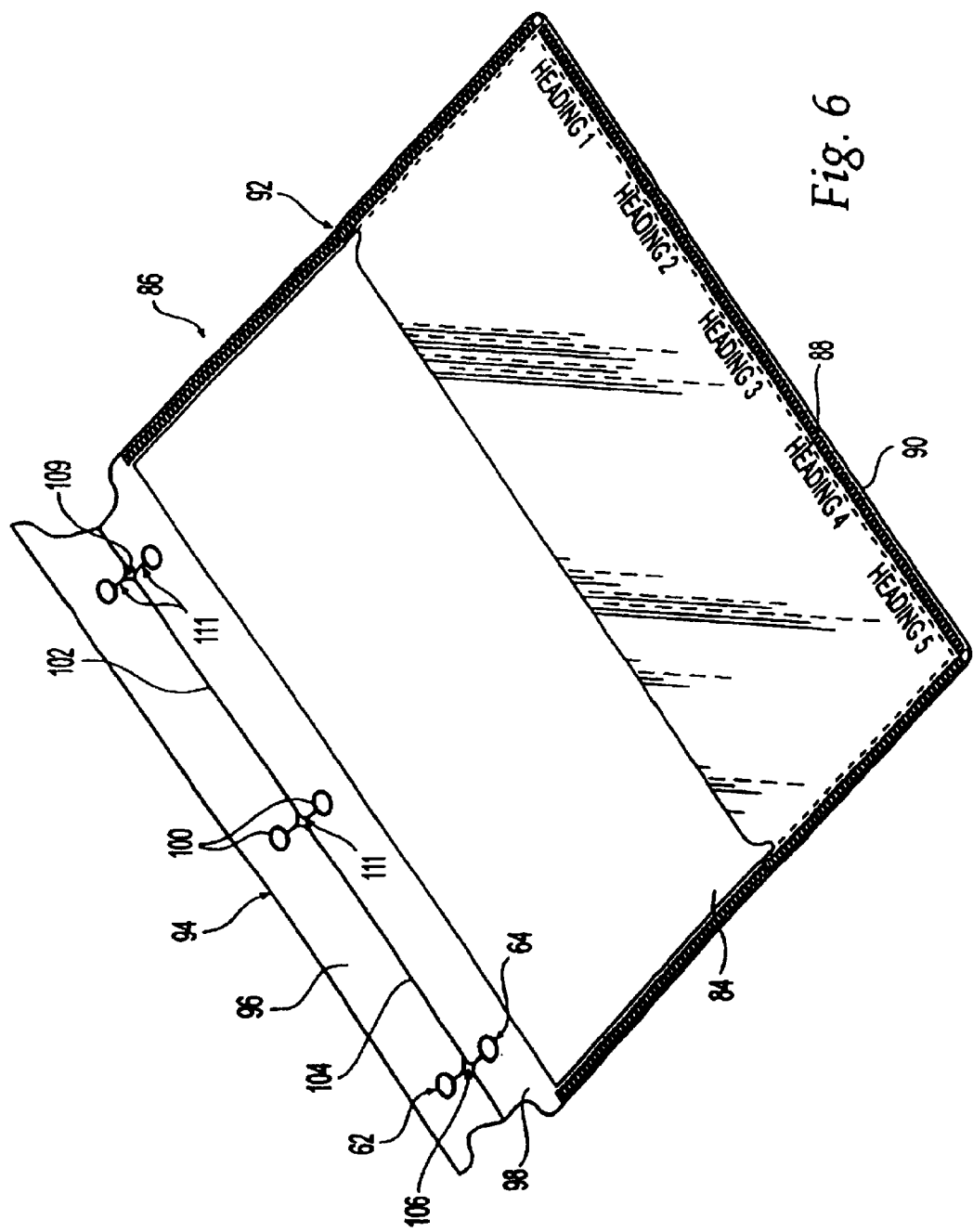
FIG. 6 is a front perspective view of an alternative embodiment of a back display element.
Figure 7:
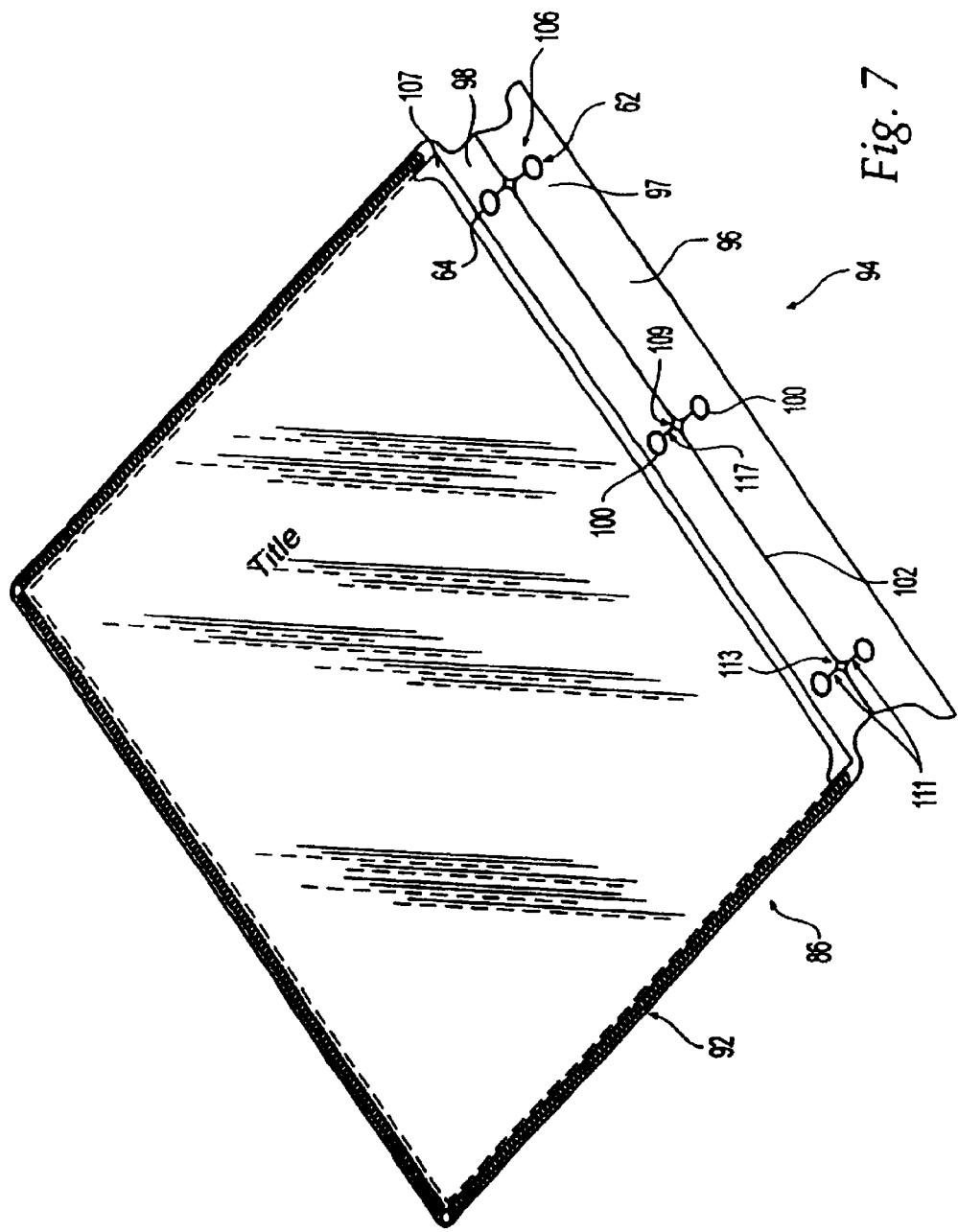
FIG. 7 is a front perspective view of the display element of FIG. 6.

Accordingly, to accommodate the variability of the size of the binder that the user may desire, an alternative embodiment of the display element 86 is mountable to the binding mechanism 30 to position the label portions at a variable distance from the label binding portion 60, as shown in FIGS. 6 and 7. Display element 86 has label portions 88 disposed adjacent to the label edge 90, a pocket 92 for receiving an indicia sheet 84, and a label binding portion 94. The label binding portion 94 includes at least two separate binding panels 96, 98 each having preferably pre-punched holes 100 for engaging the rings 32 of the binder 22. Preferably, the panels 96, 98 may have openings that are open to the perimeter of the display element, to permit insertion of a ring or spiral of a binder 22 without opening the binder 22. An opening 106 preferably connects the openings of the first and second panels and extends across the hinge 102. When the binding panels 96, 98 are folded over each other, the overlapping halves of the openings 106 provide a tapered opening 113 with a wide opening portion 109 that leads to a narrow opening portion 111. The tapered opening 113 allows a binding ring or other mechanism to be received and snapped into the openings 113 and holes 100. Additionally, the pocket 92 has an opening that extends laterally from the label edge toward the label binding portion, covering about half of the label sheet 84.

The two binding panels are preferably pivotally connected to each other at hinge line 102, which preferably comprises a scan line, and to the remaining portion of the label sheet 84 at scan line 104. When the label sheet 84 is mounted to the binder 22 through the mounting portion 62 of the first panel 96, the label edge extends beyond said stack of sheets and the binding mechanism 30 by first lateral distances. Similarly, when label sheet 84 is attached to the binder 22 through the mounting portion 64 of the second panel 98, the label edge extends beyond said stack of sheets and the binding mechanism 30 by second lateral distances that are respectively shorter than the first lateral distances. Preferably, when the label sheet 84 is attached using the second panel, the first panel is folded along the hinge 102 in an overlapping configuration with the first panel, such that the label sheet 84 is attached to the binder 22 using both mounting portions of the label sheet 84. Accordingly, the label sheet 84 may be attached to the binder 22 individually with the panels substantially parallel to and extending away from each other or in an overlapping configuration with the panels overlapping each other, to selectively vary the extension of the label edge and label portions 88 with respect to the stack of sheets and binding mechanism 30. Therefore, by securing the label sheet 84 to the binder 22 using different sets of the holes or other openings or structures to attach to the binder 22, the lateral extension of the label sheet 84 and the label portions 88 may be adjusted according to the sheet capacity of the binder 22.

The label sheet 84 is preferably adjusted to ensure that the label portions 88 extends sufficiently beyond the stack of sheets contained in the binder 22. Moreover, the user may start with the label sheet 84 attached to the binder 22 with panels in the overlapping configuration and modify the width of the label sheet 84 by using the first panel to attach to the binder 22 as more sheets are stored in the binder 22. In this manner, the label sheet 84 may be easily adjusted to accommodate the changing capacity of the binder 22 to ensure that the tabs 54 of the dividers 46–50 are in alignment with the label portions 88 of the label sheet 84. An alternative embodiment has additional panels. Referring to FIG. 7, the rear side of the display element 86 also preferably has another see-through pocket, which can cover substantially the entire rear side, to receive a rear title page 107.

Figure 8:
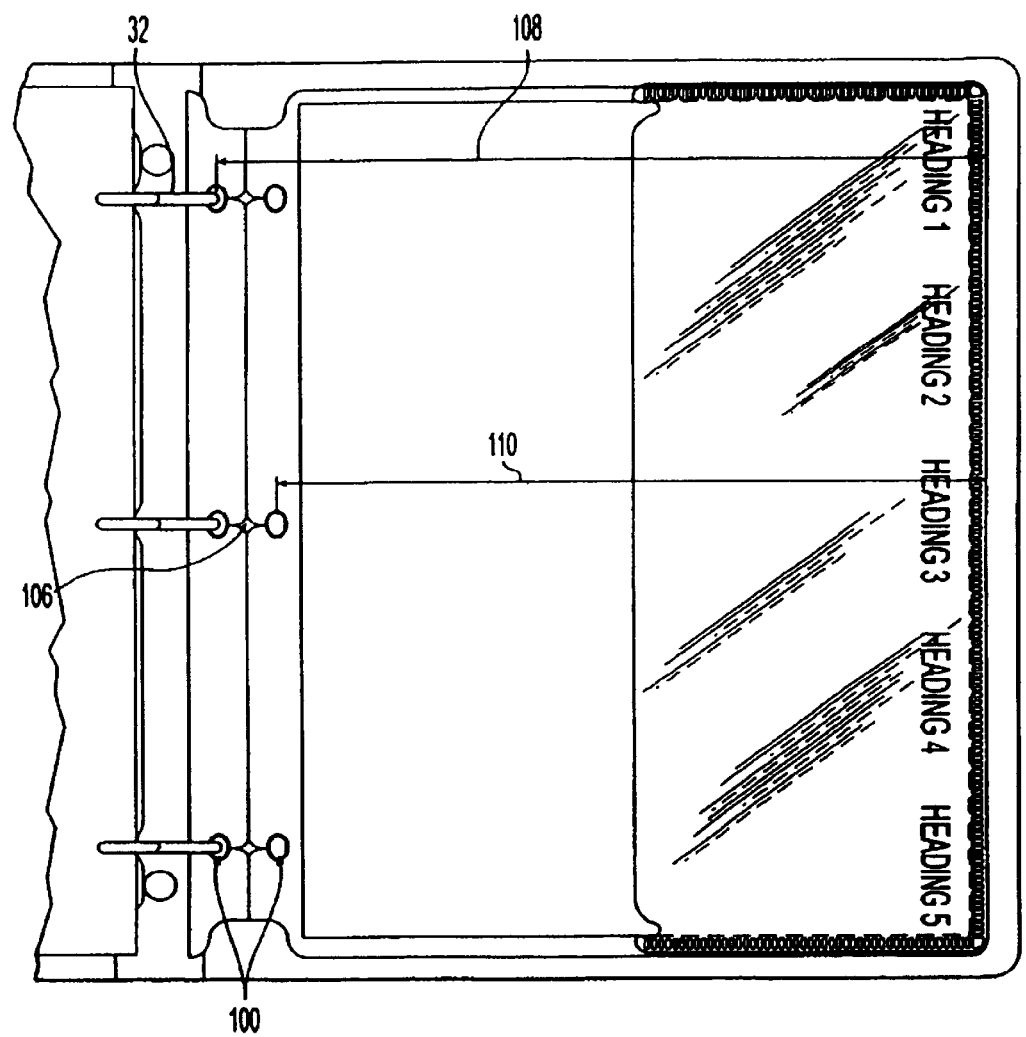
FIG. 8 is a front view thereof mounted in a binder.

In FIG. 8, the display element is shown and attached to the binder rings 32 by the holes in the first panel. Thus, the width 108 of the display element in this configuration is greater than the width 110 thereof from the openings of the first panel when attached by the second panel from the openings of the second panel.

Figure 9:
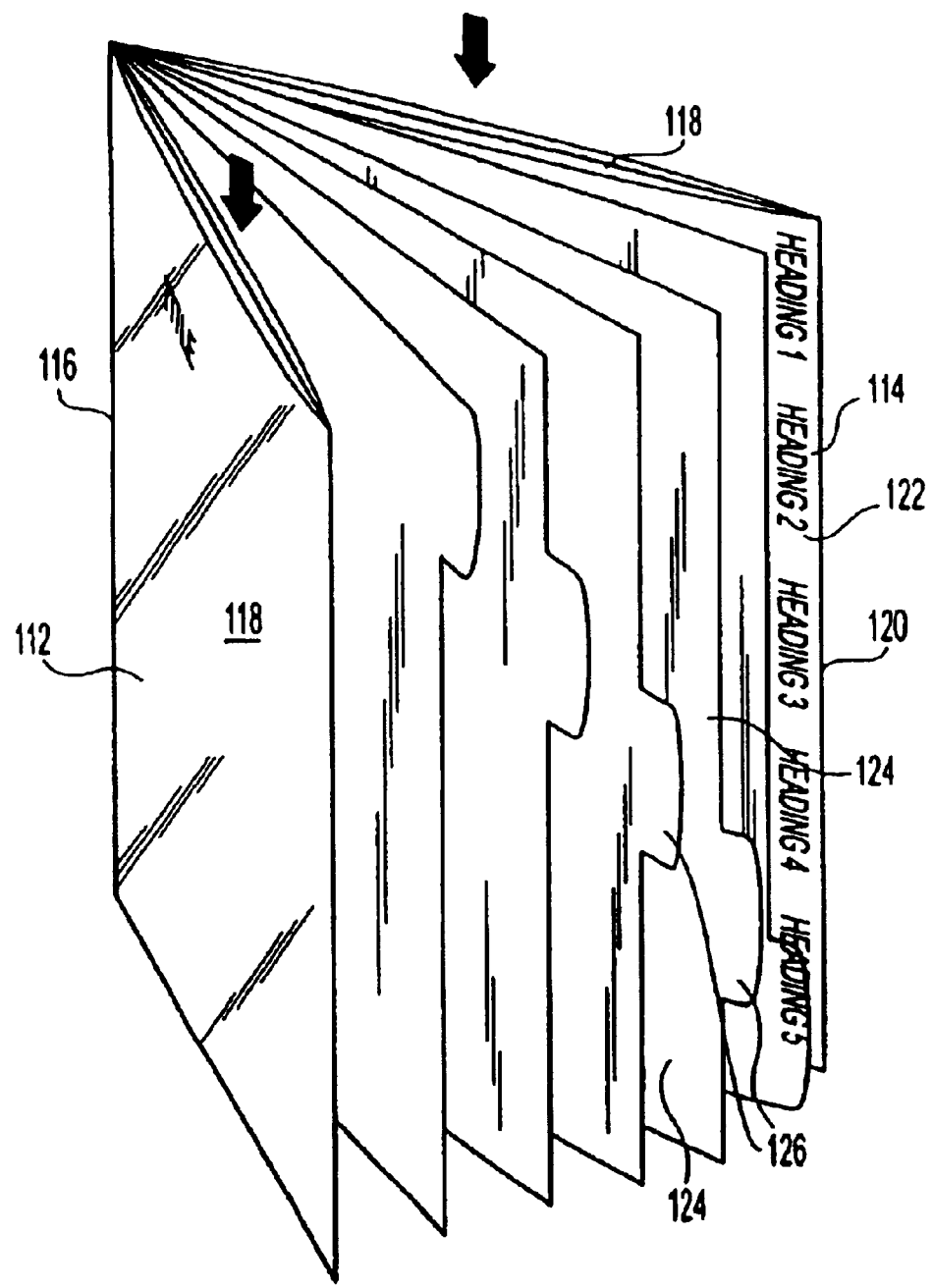
FIG. 9 is a perspective view of another embodiment of the invention.

The embodiment shown in FIG. 9 and front and back covers 112, 114 that are pivotally connected along a hinge 116 line for securing a stack of sheets between the covers. A display element 118 is associated with one or both covers and is preferably constructed to each of the covers. Most preferably, the display element includes a label edge 120 that extends beyond the stack sheets held between the covers and label portions 122 disposed adjacent to the label edge 120 and configured for receiving a label indicia 44.

A plurality of dividers 124 are disposed between the covers and have inner edges that are held in proper position for tubes 126 to overlap with the label portions by the hinge line in a protective association and position similar to the overlapping association described of the previous embodiments.

The dividers are alternatively secured to each other along a common edge, such as at the hinge 116.

Figure 10:
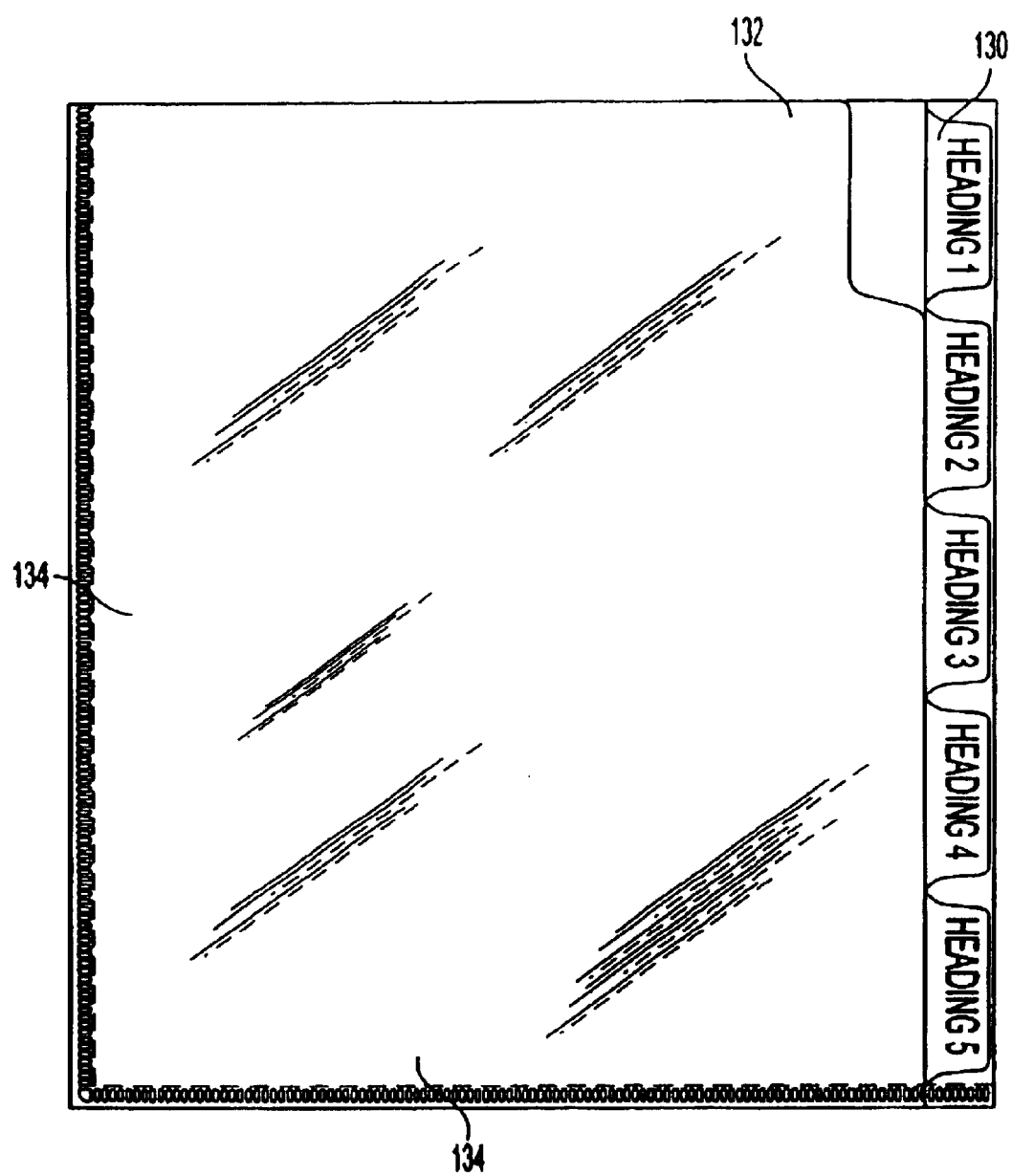
FIG. 10 is a front view of yet another embodiment of the invention.

Referring to FIG. 10, dividers 130 and label sheets 132 are secured along two adjacent edges 134 such that the dividers and the covers form various pouches therebetween for receiving sections of a stack of sheets. As folders are typically intended for holding fewer sheets than binders, by having two sealed edges, the pouch formed by the open space between the covers and the dividers conveniently and securely hold sections of the stack of sheets containing information. Additionally, each section of the stack of sheets is tabbed to facilitate access and view.

As in the previous embodiments, the display elements preferably include inside and outside transparent sheets for permitting viewing of the label portions and a title page on the outside, facing away from the stack. Using commonly available software programs, the user may prepare a cover, label indicia 44, and contents of the presentation or brochure. The prepared documents can easily be printed on a printer and inserted within their respective positions in the folder.

Figure 11:
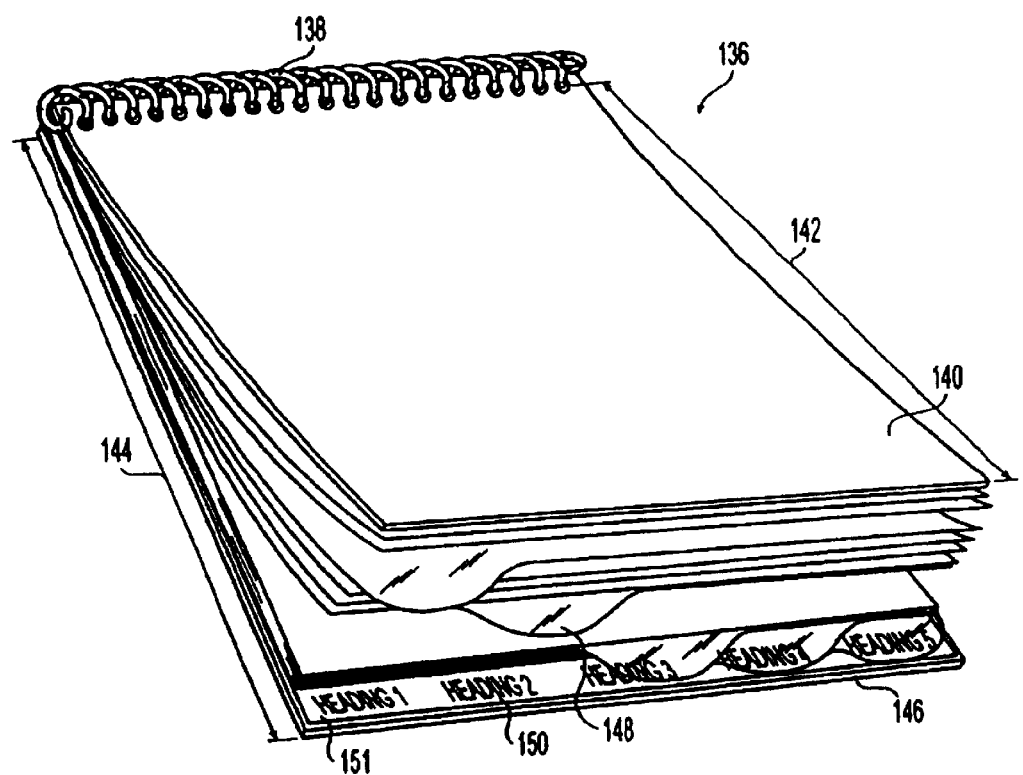
FIGS. 11 and 12 are perspective views of alternative embodiments of the invention.

The sheet holder of FIG. 11 is a spiral bound notebook 136 with a spiral binding 138 on a top side thereof. A front cover 140 of the notebook 136 has a width 142 from the binding that is shorter than the width 144 of the back cover 146. Thus, the see-through tabs 148 of the dividers and the label areas 150 of the label portions are visible even with the notebook closed. The display element 151 preferably comprises a transparent pocket affixed to the cover 140 to receive a label sheet. Alternatively, the display element 151 may include a sticker adhered to the cover in the viewing position.

Figure 12:
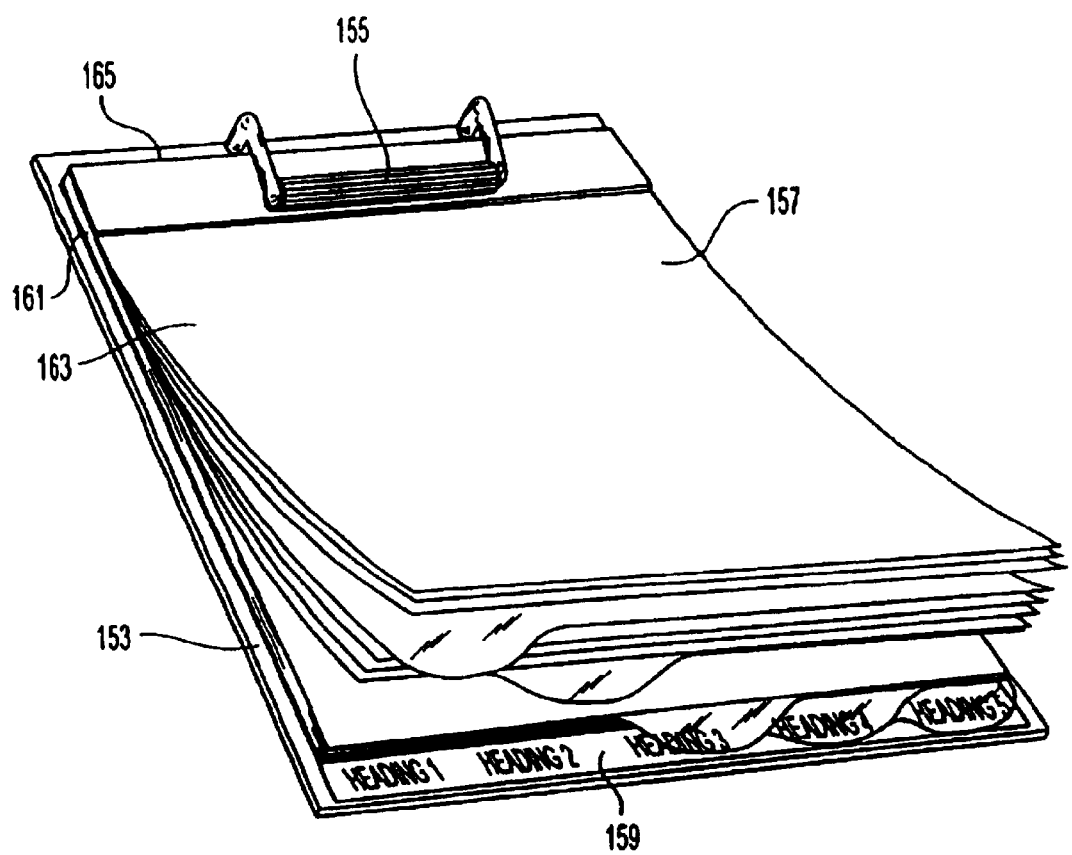

The embodiment shown in FIG. 12 is similar to the one of FIG. 11, but the stack holder of this embodiment is a clip board 153 with a resiliently biased clip 155 holding a paper pad 157. Display element 159 is preferably part of the paper pad 157, and preferably includes a rear cardboard panel 161 of the pad 157 that is attached to stack 163 at a top edge portion 165 thereof.

Figure 13:
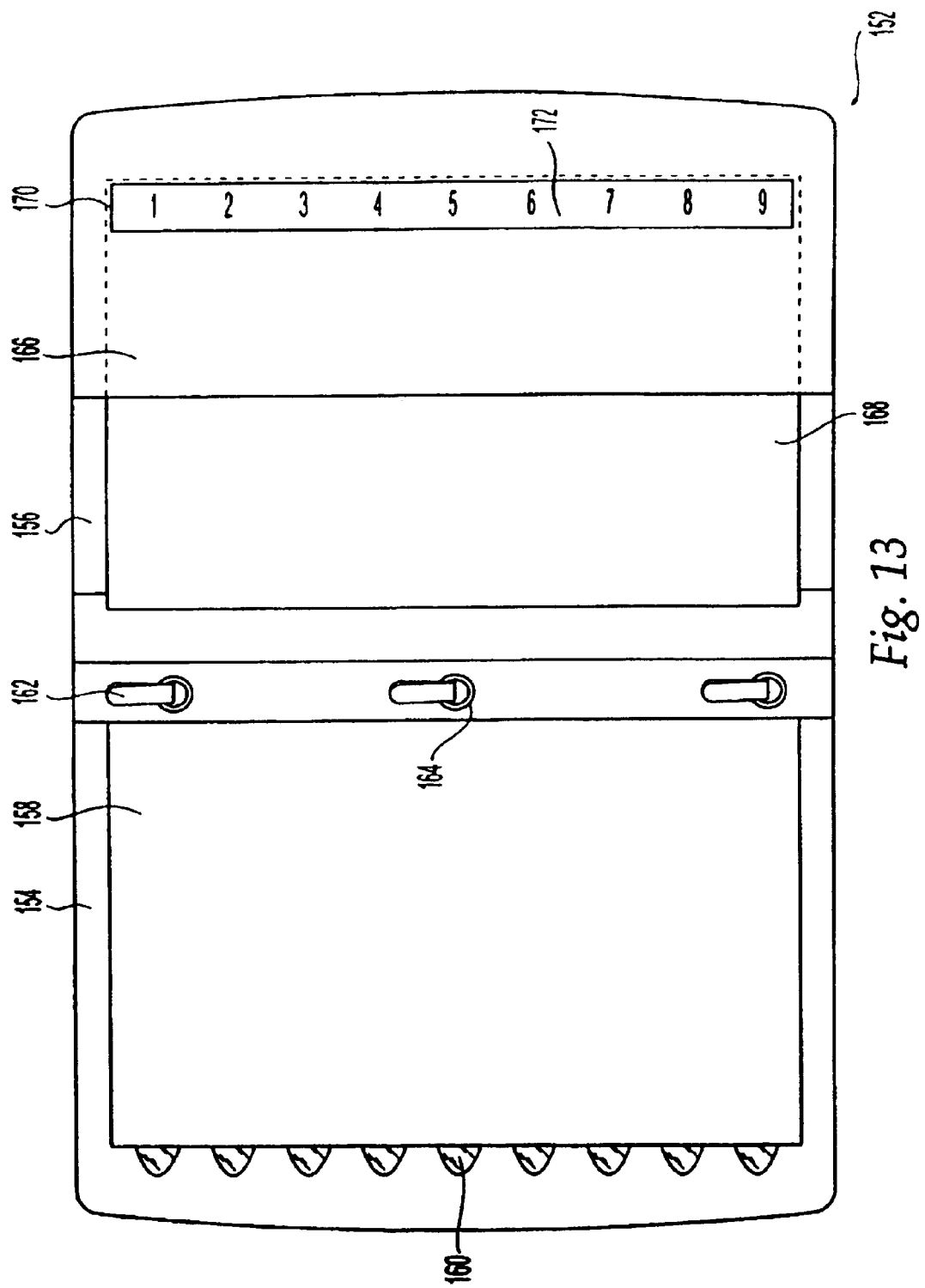
FIG. 13 is a front view of another embodiment in an open position.

FIG. 13 shows a report cover 152 with front and back covers 154, 156 connected to a stack 158 with a plurality of tabbed dividers 160 with metal band-type binding fasteners 162 that extend through both covers 154, 156 and the stack 158 and are bent around eyelets 164 in the back cover 156. The back cover 156 includes a display element with a pocket 166, preferably configured to receive a label sheet 168 of similar size as the sheets of the stack 158. A framed label window 170 permits viewing of a label portion 172 of the label sheet 168 and is positioned to align in a viewing position under the tabs of the dividers 160. In this embodiment, the front cover 154 does not have a separate display element.

Figure 14:
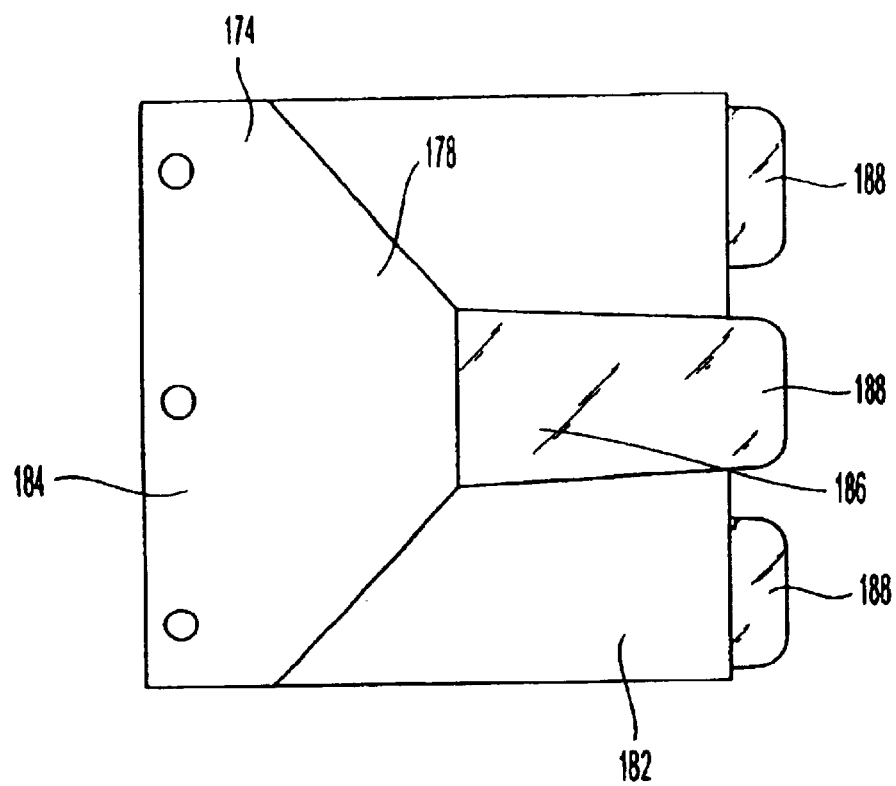
FIGS. 14 and 15 are front views of alternative embodiments of dividers and stacks according to the invention.
Figure 15:
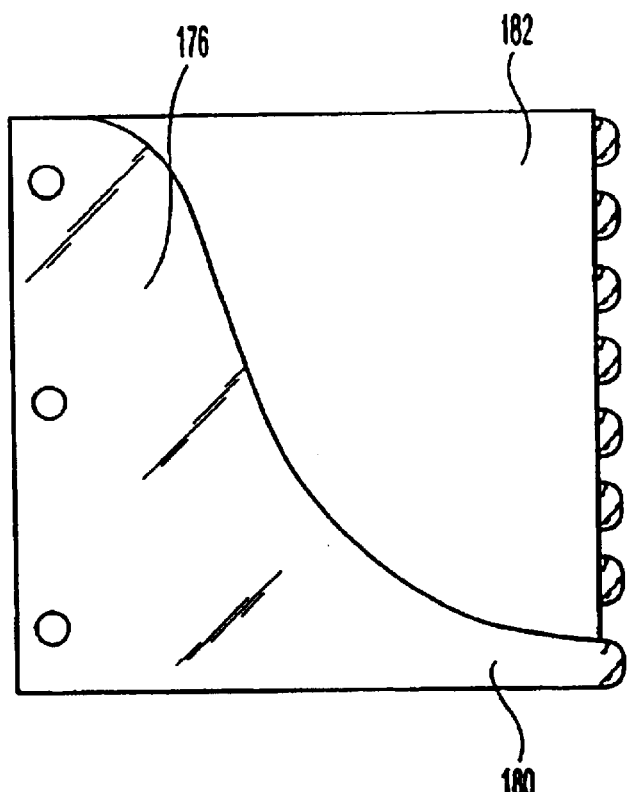

The dividers 174, 176 shown in FIGS. 14 and 15 have body portions 178, 180 shaped and dimensioned differently than the sheets of the stacks 182. These bodies 178 are non-rectangular, although another embodiment has a rectangular body that is of a different size than a stack with which it is intended to be used. Divider 174 is formed of two materials, such as a paper, cardboard, or plastic portion 184 fixed to a transparent portion 186, which forms part of the body portion 178 and the tab 188.

Figure 16:
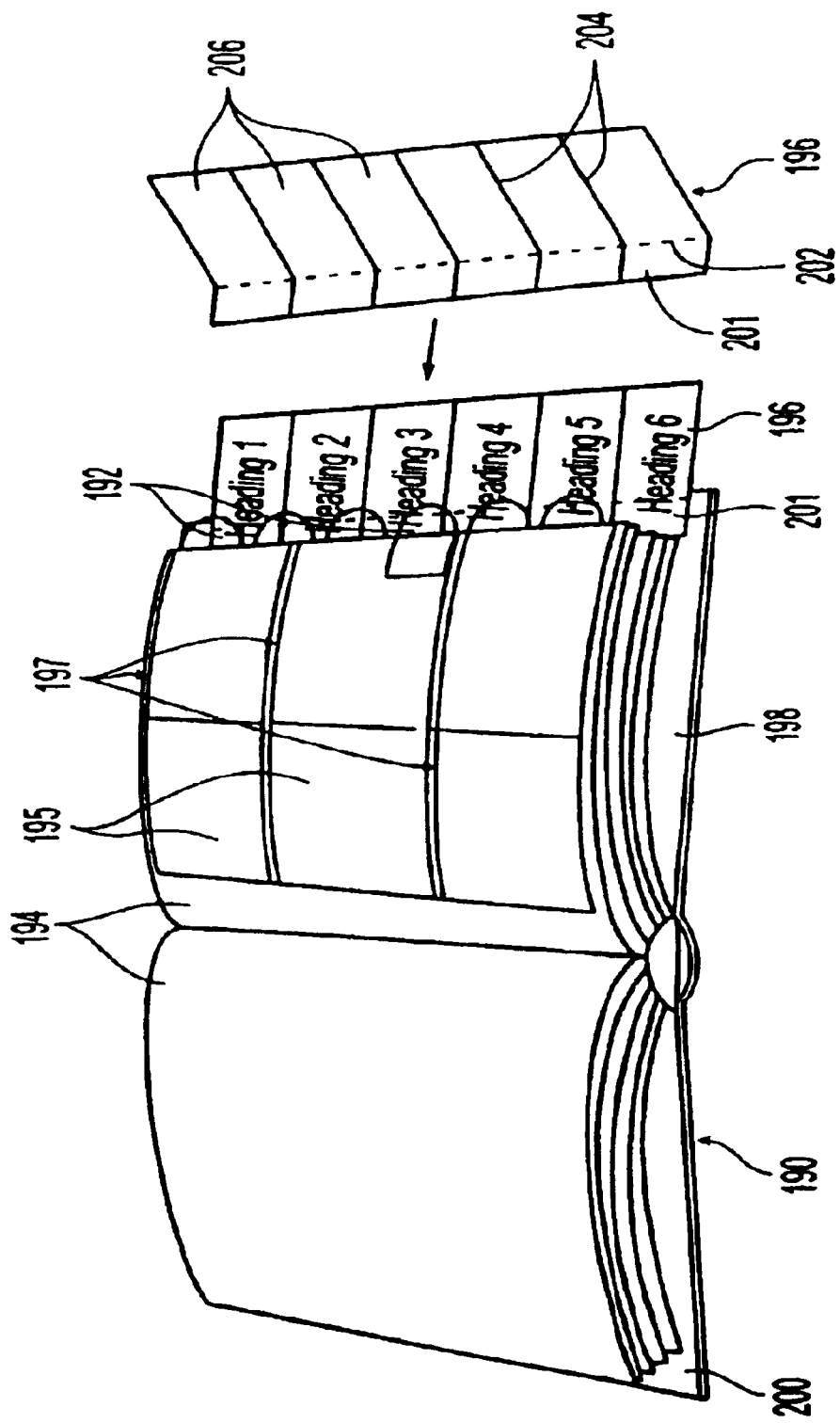
FIG. 16 is a perspective view of an alternative embodiment of the invention with adhereable tabs and label sheet.

Referring to FIG. 16, the sheet holder of this embodiment is a book 190, such as a picture album. The book 190 includes body portions, which comprise pages 194. The pages 194 may include pockets 195, preferably open on a side thereof, such as top side 197. Transparent tabs 192 are attached, preferably by adhering, to pages 194 of the book 190. A display element comprises a label sheet 196 that is attached, to a cover 198 of the book 190. Preferably, adhesive is disposed on the underside of inward portion 201, located inwardly from hinge 202, to attach to the book 190. Alternatively, the label sheet 196 can be attached to the other cover 200, or to a page 194 of the book 190, and by means other than adhesives. Hinge 202 of the label sheet 196 is preferably configured for folding the label sheet 196 thereabout to be stowed preferably completely between the covers 198, 200 when the indexing system is not in use. The tabs 192 overlap with at least a portion of label areas 206, preferably when viewed at a preselected angle, preferably generally orthogonally, with respect to the open pages 194.

The label sheet 196 includes heading dividing indicia, preferably lines 204 to visually separate label areas 206. The label sheet 196 of this embodiment is preferably provided label areas 206 configured to receive label indicia when added by a user when tabs are applied. In an alternative embodiment, the display element comprises a plurality of label sheets attached side-by-side with the label areas 206 disposed under each tab 192. In this embodiment, the stack includes the pages 194 which connect the tabs 192 to the book 190.

In this embodiment, the body portions are part of the stack that is held and divided at the tabs 192. Other pages 194 of the book 190 do not have tabs, and are contained within the divided sections.

Figure 17:
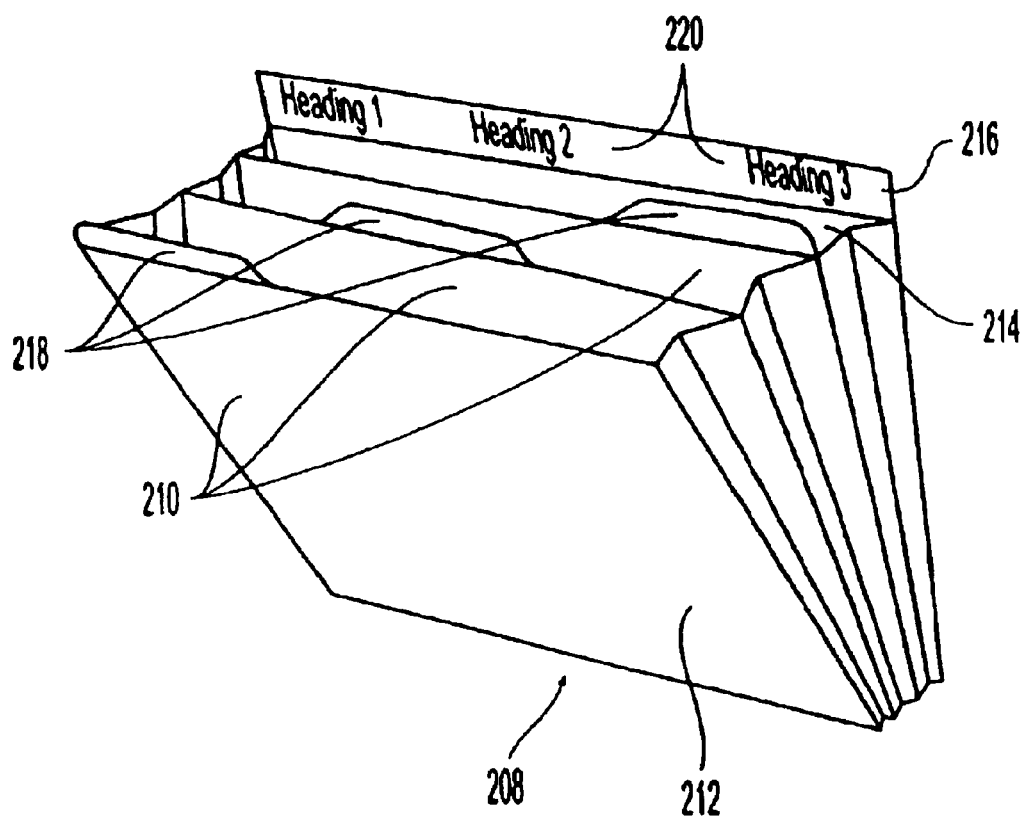
FIG. 17 is a perspective view of an accordion file constructed according to the invention.

The embodiment of FIG. 17 includes a stack holder that is an accordion file 208 with dividers 210, including the front cover 212. Back cover 214 comprises a display element 216, although the display element can be fitted instead to one of the dividers 210. See-through tabs 218 extend from the dividers 210 to overlap with the label areas 220 of the display element 216. Pockets are formed between the dividers 210 and the covers 212, 214 to contain sections of a stack. The file 208 has three expandable walls 222 that preferably connect corresponding three sides of the dividers 210 and the covers 212, 214 to expand substantially in parallel with each other.

Figure 18:
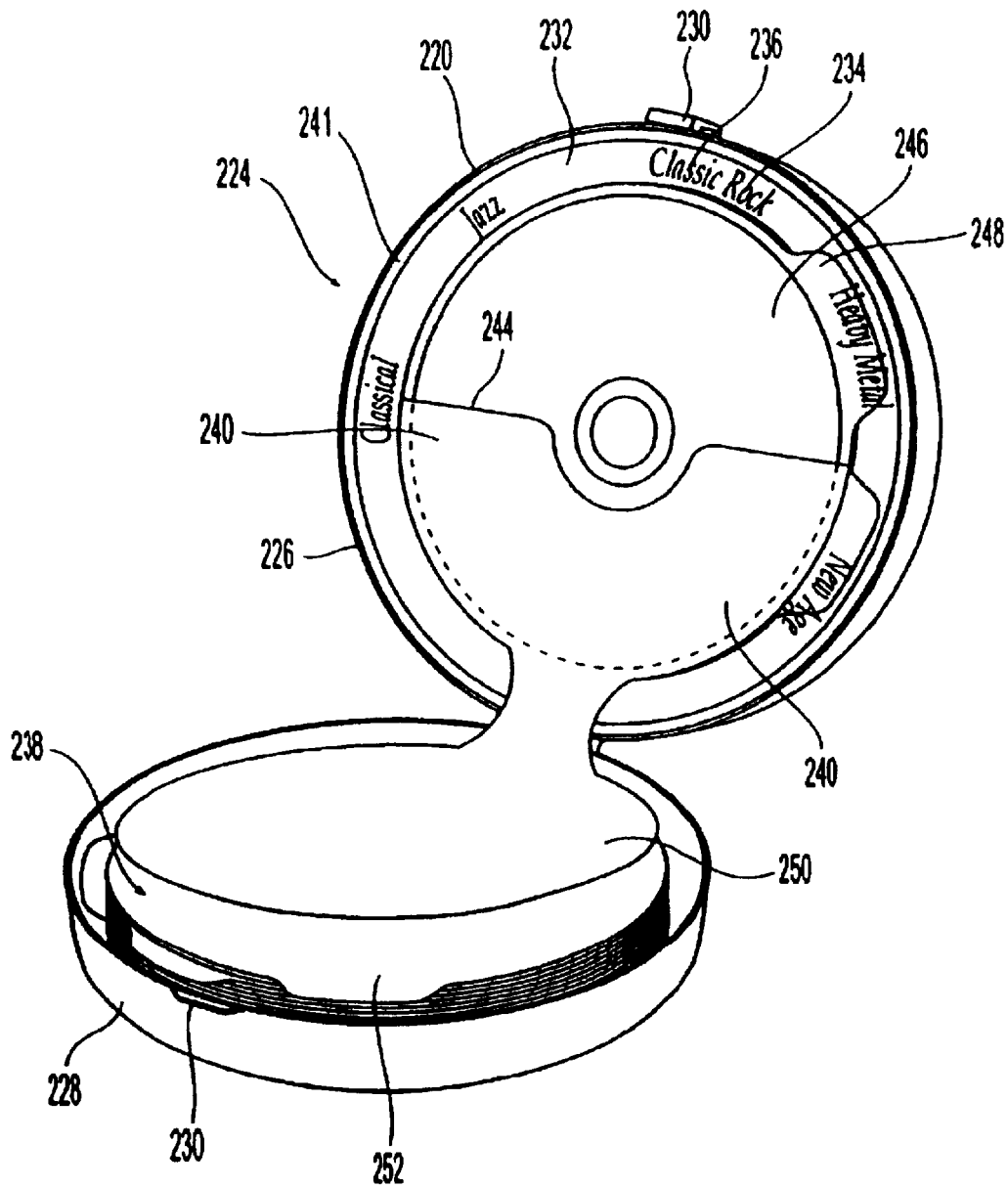
FIG. 18 is a perspective view of a disk case constructed according to the invention.

Referring to FIG. 18, an embodiment of a stack holder is a media holder, preferably a disk holder 224. The disk holder 224 includes a case 226 with top and bottom covers 228, which are preferably pivotally connected together and configured to close as a shell and hook together with closure 230. A display element 232 is disposed on the inside of the top cover 228, and includes label portions with label areas 234 with label indicia 236, in this case indicating the type of music contained on the disks in different sections of the held stack 238. The label areas 234 are arranged along a curve, preferably to follow the edge of the stack of disk holders 240.

Disk holders 240 have body portions 241 that preferably include a pocket 242 with an opening 244, and are configured to receive and hold disks 246. The pockets are preferably clear plastic sleeves with front and back pocket sheets. Other disk holding members can alternatively be used instead of pockets. The preferred shape of the body portion 241 generally follows the contour of the disks 246 to be held, and are thus preferably round. Where other objects are to be held, the shape of the body portions preferably follows the shape of the objects.

A tab 248 extends from some of the disk holders 240 and are positioned to overlap with, and allow viewing therethrough the indicia 236 on the label areas 234. Tabs 248 are arranged in an arc to follow the shape of the edges of the body portions 246. The stack also includes disk holders 250, which do not include tabs, and dividers 252 with body portions and tabs, but no pockets, to further divide the stack 238.

Figure 19:
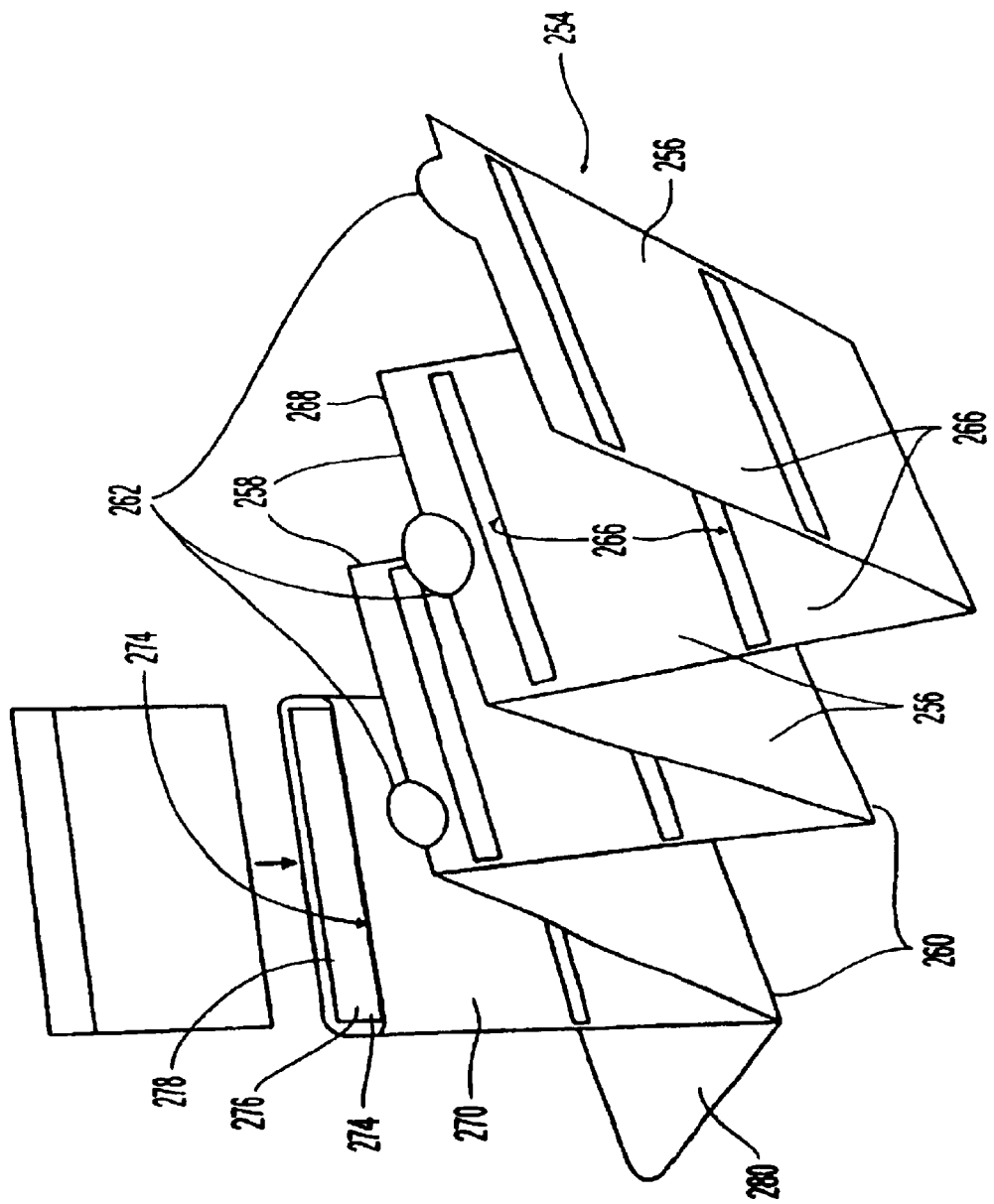
FIG. 19 is a perspective view of a wallet insert constructed according to the invention.

Referring to FIG. 19, stack holder 254 is a wallet insert with a stack of panels 256 held by alternatingly connecting at top and bottom edges 258, 260 thereof for expansion and contraction of the stack of panels 256. The panels 256 include body portions 264 with 266 pockets to receive items such as business cards and credit cards, and tabs 262 extending beyond the body portions 264. The central tabs 262 are preferably formed as cutouts from the adjacent panels 256, and protrude from top hinges 268. Back panel 256 includes a display element 270 with a pocket 272 configured to receive a label sheet 274. Indicia 276 on the label portions 278 of the display element 270 can be seen through the tabs 262 when they overlap therewith when the stack of panels 256 is contracted upon itself. Thus, a particular section of the stack can be easily identified and accessed. The wallet insert also preferably comprises a wallet attachment flap 280 connected to the panels 156 at a bottom edge 260 where two of the panels 126 are connected. The wallet attachment flap 280 is configured for insertion in a pocket of a wallet such that the stack can be expanded and contracted while attached to the wallet.

Figure 20:
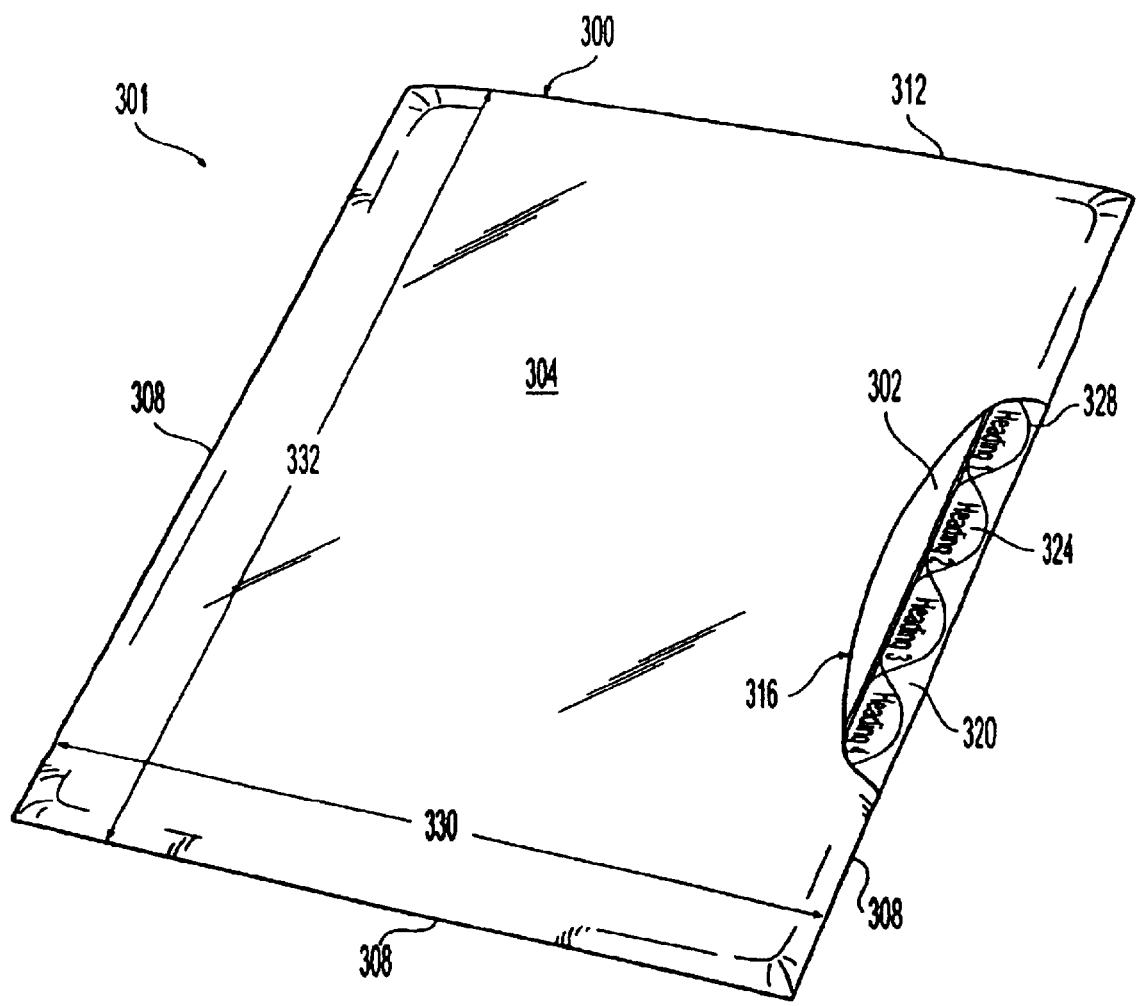
FIG. 20 is a front perspective view of an indexing system package constructed according to the invention.
Figure 21:
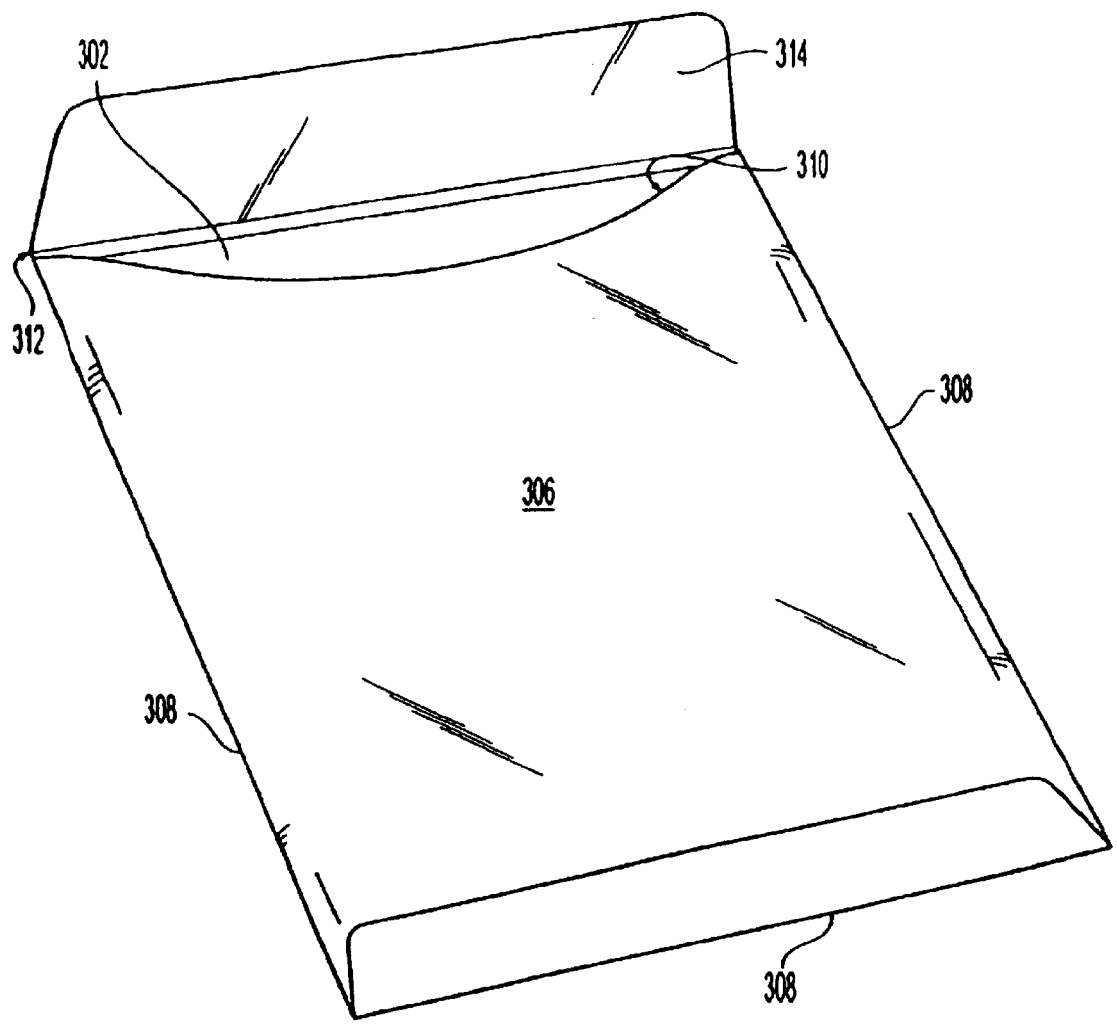
FIG. 21 is a back perspective view of the package of FIG. 20.

Referring to FIGS. 20 and 21, a preferred embodiment of an indexing system package 301 is shown comprising a container for holding a set of indexing system elements such as dividers, label sheets, and/or display elements as described above. In the preferred embodiment, the container comprises an envelope 300 having a front cover 304 and a back cover 306 joined together along edges 308. An opening 310 extends along side 312 and is dimensioned to allow for the insertion of indexing system elements between covers 304, 306. In a preferred embodiment, at least one tabbed divider 302 is received within envelope 300. As in embodiments described above, tabbed divider 302 includes a tab 328 that defines a label window for viewing label indicia therethrough. In alternate embodiments, a plurality of tabbed dividers 302 can be received within envelope 300. In other embodiments, other products, including other indexing system elements such as label sheets and or display elements can also be received within envelope 300. A flap 314 extends from front cover 304 and bends over opening 310 to contact back cover 306 to seal the indexing system elements within the envelope 300.

Front cover 304 includes an opening 316, which is preferably a cut out portion, adjacent the tabs or label windows of the dividers contained therein such that the label windows are visible in opening 316. A label portion 320 is disposed on an interior surface of back cover 306 and is also visible in opening 316. At least one label indicia 324 is provided on the label portion 320. The indicia 324 may be printed directly on the envelope 300, may be adhesively applied, or may, for example, be provided on a separate sheet behind the dividers 302. In the preferred embodiment, label portion 320 includes a plurality of label indicia 324 and each indicia is associated with a tab 328 of the dividers 302 inserted into envelope 300 such that the tab 328 is positioned over at least a portion of the label portion 320. The label indicia 324 are positioned to be behind a corresponding tab 328 when the dividers 302 are inserted into envelope 300 such that the indicia 324 are viewable through the tabs 328. In this way, a potential customer can easily envision how a particular divider may appear when used in a binder or in other applications described above. Also, a customer may preferably bend back the portion of the envelope 300 that is exposed through opening 316 to see that the indicia 324 is printed behind the tabs 328.

In the preferred embodiment, opening 316 is semielliptical and is positioned toward the longitudinal center of envelope 300. In alternate embodiments, opening 316 can have different geometric configurations, different dimensions, and different locations in relation to the container or envelope 300. The position of the opening 316 is selected to expose the windows portions of tabs 328 and the indicia 324.

Envelope 300 is preferably made from laminated paper, however, paper board, cardboard, plastic, or other suitable materials can be used. The front and back covers 304, 306 of envelope 300 are sized slightly larger than the indexing system elements which are to be contained therein. For example, in a preferred embodiment where the indexing system is designed for 8½×11 inch sheets of paper, front and back covers 304, 306 have a width 330 slightly larger than the width of the tabbed dividers and a length 332 slight larger than 11 inches. In this way, the tabs 328 of tabbed dividers 302 are positively positioned over the indicia 324 when the dividers are received in envelope 300 and the indicia is visible through the label window of tabs 328. In alternate embodiments, the container can have numerous other configurations besides an envelope. For example, in an alternate embodiment the container could be in the form of a box or any other suitable container.

Figure 22:
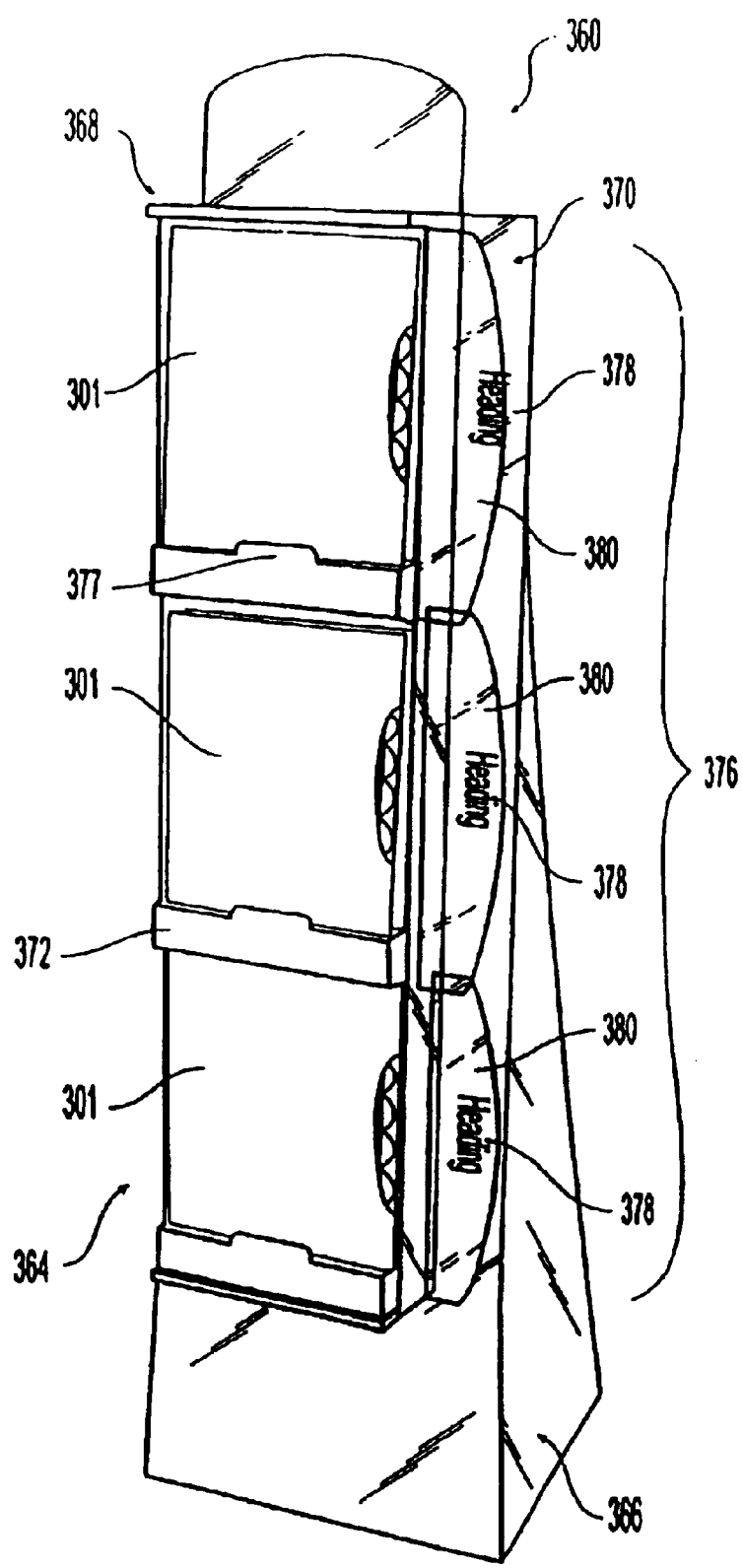
FIG. 22 is a perspective view of a display stand constructed according to the invention.

Referring to FIG. 22, a preferred display stand 360 is shown for displaying indexing system packages 301. Display stand 360 includes an upright portion 364 extending from a base 366. In a preferred embodiment, base 366 is configured to rest upon the floor and upright section 364 is configured to extend substantially vertically therefrom to display indexing system packages 301 at a predetermined height from the floor to assist customers in viewing and purchasing the packages. In an alternative embodiment, the display stand 360 is configured to attach to a wall. Display stand 360 is preferably made from a cardboard material, however, other suitable materials can be used. Upright portion 364 includes a product storage member or portion 368 and a face member or portion 370 facing the front of display stand 360. Product storage portion 368 includes at least one compartment 372 for holding indexing system packages 301. Each compartment preferably has a shelf and a tab 377 extending upwardly therefrom to keep the packages 301 from sliding off the shelf. If a customer desires to purchase an indexing system package, the customer may simply remove a desired package from one of compartments 372. Face portion 370 is set back slightly from the front of product storage portion 368. Face portion 370 generally extends along the side of product storage portion 368 and preferably includes a label portion 376 having label indicia 378 disposed thereupon. At least one tab member 380 extends from product storage portion 368 over face portion 370 and over at least a portion of label portion 376 such that at least a portion of the label indicia 378 is covered by tab member 380.

A window portion of each of the tab members 380 is configured to permit viewing of the indicia 378 therethrough. Preferably the entire tab member 380 is made of a sufficiently translucent or transparent material to permit viewing of the indicia 378 behind the tab member 380. In alternate embodiments, the window portion may be in the form of a cutout, as shown in FIG. 4.

Preferably a plurality of tabs are provided and extend from product storage portion 368 over face portion 370 and extend in alignment with and over different sections of label portion 376. In this manner, each tab member 378 preferably overlaps a different label indicia 378 disposed on the label portion 376, in substantially the same manner as would occur when the indexing system is used in a binder or the various other applications described herein. This configuration advantageously allows a potential customer to quickly envision how the indexing system works before purchasing the system. In an alternative embodiment, the display stand includes a product storage portion and a face portion on the back side of the stand as well so that the a customer can view the packages from both sides of the stand.

Figure 23:
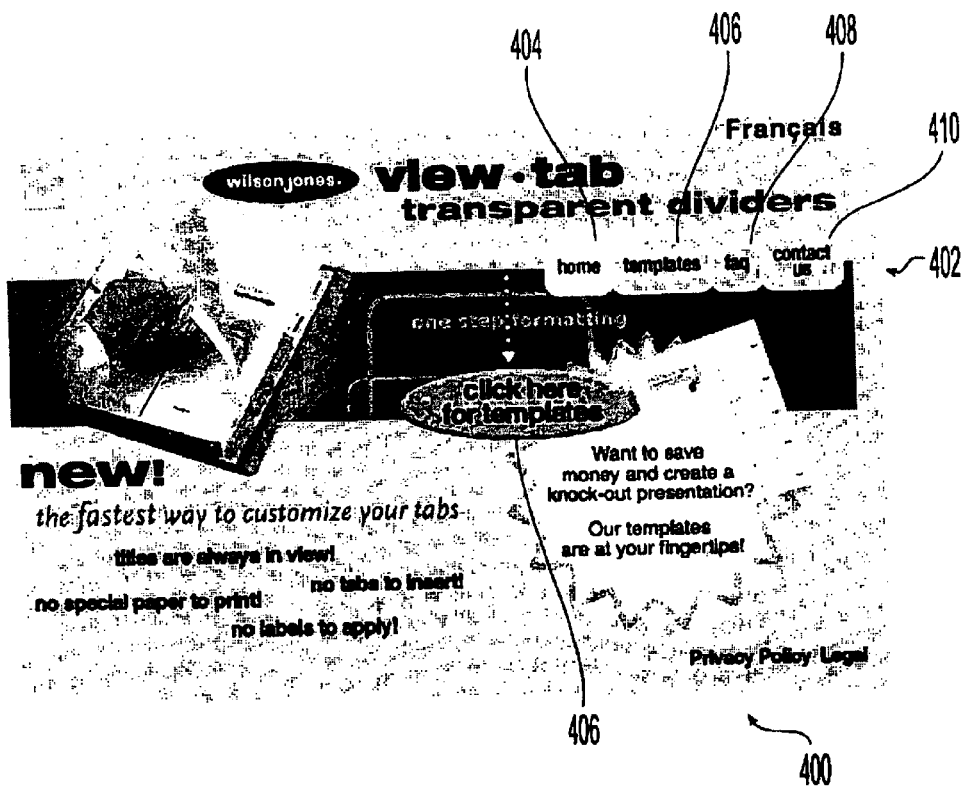
FIG. 23 is a screen shot of an Internet home page according to the invention.

In the preferred embodiment, a user of the indexing system may create an index page, table of contents page, or label sheet from a client computer connected to a server computer over the Internet or other network. For example, from a client computer, the user can access a server computer hosting a web site, such as www.wjindex.com. A preferred web site includes a home page, such as home 400 shown in FIG. 23, to welcome a web user. The web site also includes several option buttons or links 402 which are hyperlinked to other web pages that are part of the web site. In the preferred embodiment buttons 402 include a home link 404, template links 406, a frequently asked questions link 408 which links to a web page that displays frequently asked questions, and a contact link 410 which links to a web page that displays information on how to contact a person about the contents of the web site.

Figure 24:
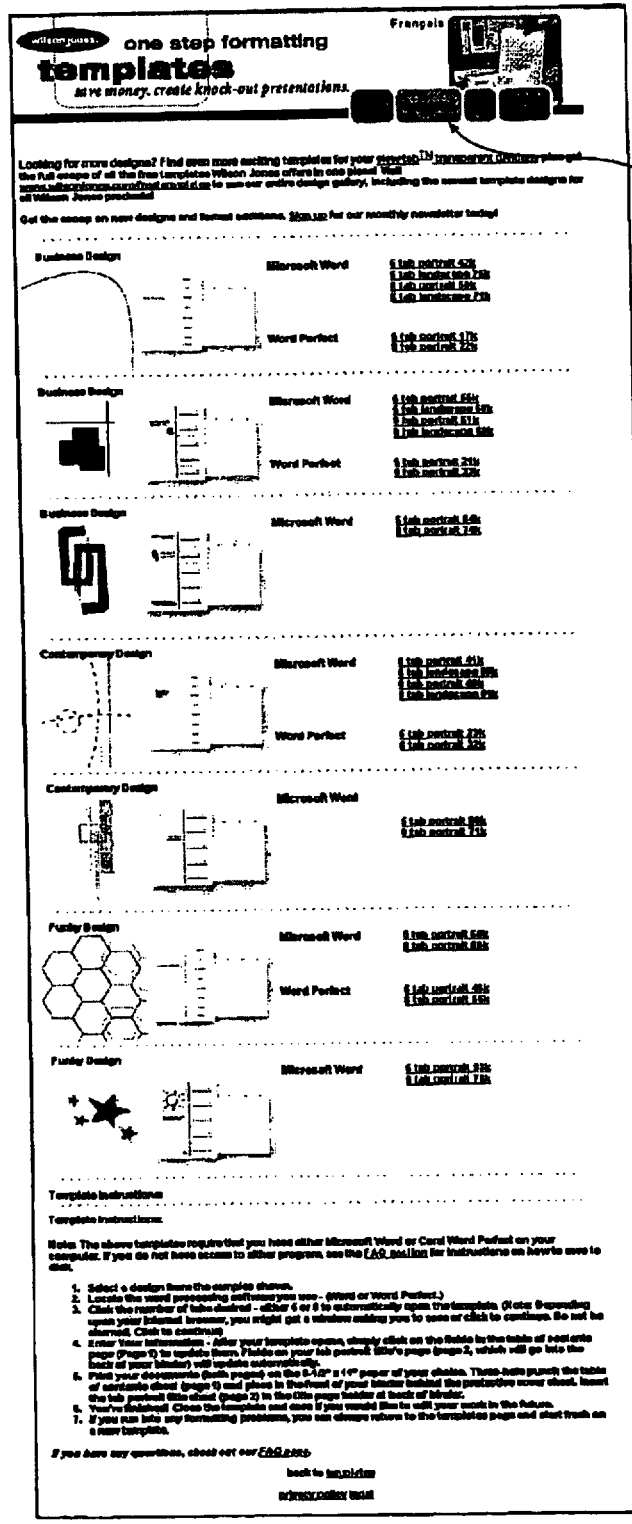
FIG. 24 is screen shot of a template web page according to the invention.

Referring to FIG. 24, a template web page 412 is accessed if a user selects template link 406. From the template web page 412 the user can select from several choices of templates to download to the user's computer to form the label portions and label indicia described above. In a preferred embodiment, the templates are electronic files available for download and are compatible with numerous types of word processing programs, such as Corel Word Perfect or Microsoft Word, among others. In other embodiments, the templates are software specific and a user must select a template compatible with the type of word processing software being used on the client computer. In one embodiment, once the user selects a template, the word processing application is opened on the client computer and the selected template is shown. The templates are configured to provide a plurality of user modifiable text boxes when the template is used with the appropriate software. In this manner, the template is configured to enable the printing of a label sheet with text boxes printed on a sheet of paper in a preselected format to create a label display element that can be used in an indexing system as described above.

Figure 25:
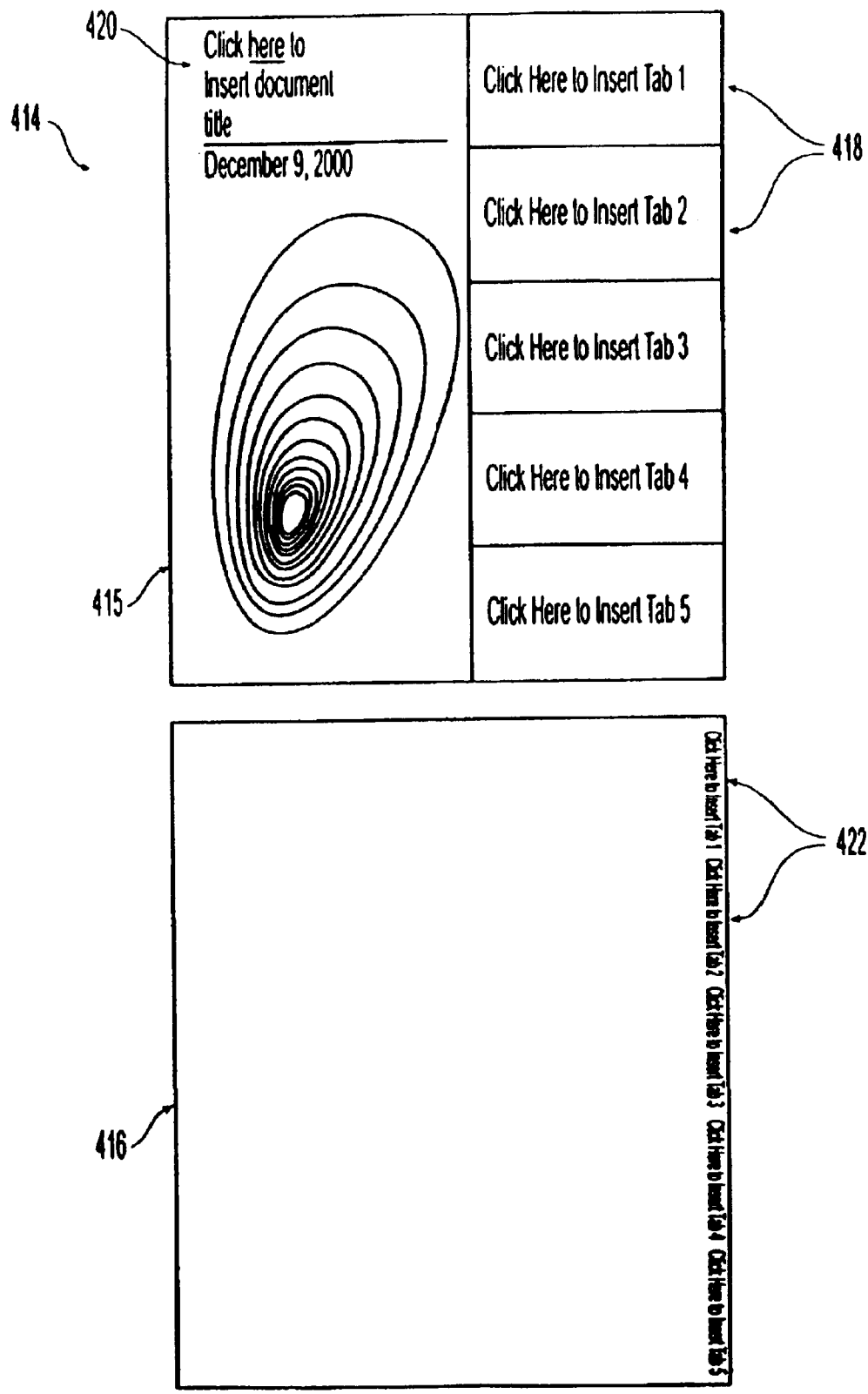
FIG. 25 is a view of a template according to the invention.

Referring to FIG. 25, one embodiment of a template 414 includes a table of contents page 415 and a label page 416. Contents page 415 includes a plurality of tab text boxes 418 and a title text box 420 formatted to occupy a preselected section of a piece of paper. Label sheet 416 includes tab text boxes 422 which correspond to tab text boxes 418. When template 414 is accessed by a word processing program, headings, such as tab names or the document title, can be typed into text boxes 418, 420 as desired. When headings are inserted into tab text boxes 418 on contents page 415, tab text boxes 422 of label page 416 include the same headings as the corresponding text box on contents page 415. The user can then print out the contents page and label page on standard 8½×11 paper to form label sheets to be inserted into appropriate display elements as described above. In this way, the templates are resident on the web and the user can easily create label portions having label indicia with predefined spacing such that the label indicia correlate or match up with the tabs or window portions described above.

One of ordinary skill in the art can envision numerous variations and modifications. All of these modifications are contemplated by the true spirit and scope of the following claims.

What is claimed is:

1. An indexing system comprising:
  a label display element adjacent a divided stack of objects, the label display element including a plurality of spaced label indicia disposed beyond an edge of the stack, each label indicia identifying a separate divided portion of the divided stack of objects; and
  a plurality of tabs substantially adjacent the objects of the stack, each tab extending beyond the stack, over the label display element, and over a respective label indicia on the label display element, each tab being offset from the label indicia such that at least one separate divided portion of the divided stack of objects may be interposed between the tab and the label indicia, and each tab including a sufficiently translucent material such that the respective label indicia is visible through the material.

2. The indexing system of claim 1, wherein the tabs are offset from one another by at least one of the separate divided portions of the divided stack of objects such that each tab is offset from the label display element at a different distance.

3. The indexing system of claim 1, wherein the label display element includes a single sheet of material containing the plurality of label indicia.

4. The indexing system of claim 1, wherein the label display element is adjacent one end of the stack of objects.

5. The indexing system of claim 1, wherein the plurality of label indicia is spaced to extend substantially along the entire edge of the stack.

6. The indexing system of claim 1, wherein each tab has a length shorter than a total length of the edge of the stack.

7. The indexing system of claim 1, wherein the plurality of tabs is substantially equally spaced along the entire edge of the stack.

8. The indexing system of claim 1, wherein each tab is coupled to a divider configured for dividing two of the separate divided portions of the divided stack of objects.

9. The indexing system of claim 1, further comprising a second label display element, the first and second label display elements adjacent apposite ends of the stack.

10. An indexing system for use with an apparatus capable of holding a plurality of objects in a stack, the indexing system comprising:
  a label display element positioned at a first location relative to the stack, the label display element including first and second spaced label indicia disposed beyond an edge of the stack, the first label indicia identifying a first object in the stack and the second label indicia identifying a second object in the stack;

a first tab positioned at a second location relative to the stack such that the first tab is offset from the label display element by at least one object in the stack, the first tab extending beyond the edge of the stack, over the label display element, and over the first label indicia on the label display element, the first tab including a sufficiently translucent material such that the first label indicia is visible through the first tab; and a second tab positioned at a third location relative to the stack such that the second tab is offset from the first tab by at least one object in the stack, the second tab extending beyond the edge of the stack, over the label display element, and over the second label indicia on the label display element, the second tab including a sufficiently translucent material such that the second label indicia is visible through the second tab.

11. The indexing system of claim 10, wherein the first and second label indicia are spaced along the edge of the stack.

12. The indexing system of claim 10, wherein the first and second tabs each have a length shorter than a total length of the edge of the stack.

13. The indexing system of claim 10, wherein the first and second tabs are generally spaced from one another in a direction extending along the edge of the stack.

14. The indexing system of claim 10, wherein the first tab is coupled to a first divider configured for separating the objects of the stack, the second tab is coupled to a second divider configured for separating the objects of the stack, and the second divider is spaced from the first divider by at least one object of the stack.

15. The indexing system of claim 10, wherein the label display element includes a single sheet of material containing the first and second label indicia.

16. The indexing system of claim 10, wherein the label display element is adjacent one end of the stack of objects.

17. The indexing system of claim 10, wherein the apparatus capable of holding the plurality of objects in a stack is one of a binder, a folder, a notebook, a paper pad, a report cover, a book, an accordion file, and a disk holder.

18. The indexing system of claim 10, further comprising a second label display element, the first and second label display elements adjacent opposite ends of the stack.

19. The indexing system of claim 10, wherein the first and second tabs are different colors.

* * * * *